US012783479B2

(12) United States Patent
Hansen

(10) Patent No.: US 12,783,479 B2
(45) Date of Patent: Nov. 3, 2026

(54) MEASURING DATA QUALITY

(71) Applicant: Wells Fargo Bank, N.A., San Francisco, CA (US)

(72) Inventor: Joel Andrew Hansen, Brooklyn, NY (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 19/040,518

(22) Filed: Jan. 29, 2025

(65) Prior Publication Data

US 2026/0220103 A1 Jul. 30, 2026

(51) Int. Cl.
*G06F 16/215* (2019.01)

(52) U.S. Cl.
CPC .................................. *G06F 16/215* (2019.01)

(58) Field of Classification Search
CPC .................................................... G06F 16/215
USPC ......................................................... 707/694
See application file for complete search history.

(56) References Cited

U.S. PATENT DOCUMENTS

2018/0137151 A1* 5/2018 Kabra .................... G06F 16/215
2020/0279623 A1* 9/2020 Ozeran ................. G06F 16/215

* cited by examiner

*Primary Examiner* — Tony Mahmoudi
(74) *Attorney, Agent, or Firm* — Shumaker & Sieffert, P.A.

(57) ABSTRACT

A computing system may determine, for each of a plurality of data records, a corresponding bit validation score that encodes a corresponding data validation answers for a corresponding data record and may store, an integer value of the corresponding bit validation score for each of the plurality of data records. The computing system may select a perspective from a plurality of perspectives each associated with a corresponding one or more data quality rules and may perform one or more bitwise operations between a bit filter score associated with a data quality rule of the perspective and the corresponding bit validation score for each of the plurality of data records to determine whether the plurality of data records meet the data quality rule. The computing system may output an indication of whether the plurality of data records meet the data quality rule.

17 Claims, 10 Drawing Sheets

Perspective 1
902

```
if bfs1 == bfs1 & bvs1: print(f"bfs1 for bvs1:
{True}") else: print(f"bfs1 for bvs1: {False}") if
bfs1 == bfs1 & bvs2: print(f"bfs1 for bvs2:
{True}") else: print(f"bfs1 for bvs2: {False}") if
bfs1 == bfs1 & bvs3: print(f"bfs1 for bvs3:
{True}") else: print(f"bfs1 for bvs3: {False}") if
bfs1 == bfs1 & bvs4: print(f"bfs1 for bvs4:
{True}") else: print(f"bfs1 for bvs4: {False}") if
bfs1 == bfs1 & bvs5: print(f"bfs1 for bvs5:
{True}") else: print(f"bfs1 for bvs5: {False}") if
bfs1 == bfs1 & bvs6: print(f"bfs1 for bvs6:
{True}") else: print(f"bfs1 for bvs6: {False}") if
bfs1 == bfs1 & bvs7: print(f"bfs1 for bvs7:
{True}") else: print(f"bfs1 for bvs7: {False}") if
bfs1 == bfs1 & bvs8: print(f"bfs1 for bvs8:
{True}") else: print(f"bfs1 for bvs8: {False}") if
bfs1 == bfs1 & bvs9: print(f"bfs1 for bvs9:
{True}") else: print(f"bfs1 for bvs9: {False}") if
bfs1 == bfs1 & bvs10: print(f"bfs1 for bvs10:
{True}") else: print(f"bfs1 for bvs10: {False}")
```

```
bfs1 for bvs1: False
bfs1 for bvs2: False
bfs1 for bvs3: False
bfs1 for bvs4: False
bfs1 for bvs5: True
bfs1 for bvs6: False
bfs1 for bvs7: True
bfs1 for bvs8: False
bfs1 for bvs9: False
bfs1 for bvs10: False
```

Perspective 2
904

```
if bfs2 == bfs2 & bvs1: print(f"bfs2 for bvs1:
{True}") else: print(f"bfs2 for bvs1: {False}") if
bfs2 == bfs2 & bvs2: print(f"bfs2 for bvs2:
{True}") else: print(f"bfs2 for bvs2: {False}") if
bfs2 == bfs2 & bvs3: print(f"bfs2 for bvs3:
{True}") else: print(f"bfs2 for bvs3: {False}") if
bfs2 == bfs2 & bvs4: print(f"bfs2 for bvs4:
{True}") else: print(f"bfs2 for bvs4: {False}") if
bfs2 == bfs2 & bvs5: print(f"bfs2 for bvs5:
{True}") else: print(f"bfs2 for bvs5: {False}") if
bfs2 == bfs2 & bvs6: print(f"bfs2 for bvs6:
{True}") else: print(f"bfs2 for bvs6: {False}") if
bfs2 == bfs2 & bvs7: print(f"bfs2 for bvs7:
{True}") else: print(f"bfs2 for bvs7: {False}") if
bfs2 == bfs2 & bvs8: print(f"bfs2 for bvs8:
{True}") else: print(f"bfs2 for bvs8: {False}") if
bfs2 == bfs2 & bvs9: print(f"bfs2 for bvs9:
{True}") else: print(f"bfs2 for bvs9: {False}") if
bfs2 == bfs2 & bvs10: print(f"bfs2 for bvs10:
{True}") else: print(f"bfs2 for bvs10: {False}")
```

```
bfs2 for bvs1: False
bfs2 for bvs2: False
bfs2 for bvs3: False
bfs2 for bvs4: False
bfs2 for bvs5: False
bfs2 for bvs6: True
bfs2 for bvs7: False
bfs2 for bvs8: True
bfs2 for bvs9: False
bfs2 for bvs10: False
```

Perspective 3
906

```
if bfs3 == bfs3 & bvs1: print(f"bfs3 for bvs1:
{True}") else: print(f"bfs3 for bvs1: {False}") if
bfs3 == bfs3 & bvs2: print(f"bfs3 for bvs2:
{True}") else: print(f"bfs3 for bvs2: {False}") if
bfs3 == bfs3 & bvs3: print(f"bfs3 for bvs3:
{True}") else: print(f"bfs3 for bvs3: {False}") if
bfs3 == bfs3 & bvs4: print(f"bfs3 for bvs4:
{True}") else: print(f"bfs3 for bvs4: {False}") if
bfs3 == bfs3 & bvs5: print(f"bfs3 for bvs5:
{True}") else: print(f"bfs3 for bvs5: {False}") if
bfs3 == bfs3 & bvs6: print(f"bfs3 for bvs6:
{True}") else: print(f"bfs3 for bvs6: {False}") if
bfs3 == bfs3 & bvs7: print(f"bfs3 for bvs7:
{True}") else: print(f"bfs3 for bvs7: {False}") if
bfs3 == bfs3 & bvs8: print(f"bfs3 for bvs8:
{True}") else: print(f"bfs3 for bvs8: {False}") if
bfs3 == bfs3 & bvs9: print(f"bfs3 for bvs9:
{True}") else: print(f"bfs3 for bvs9: {False}") if
bfs3 == bfs3 & bvs10: print(f"bfs3 for bvs10:
{True}") else: print(f"bfs3 for bvs10: {False}")
```

```
bfs3 for bvs1: False
bfs3 for bvs2: False
bfs3 for bvs3: False
bfs3 for bvs4: False
bfs3 for bvs5: True
bfs3 for bvs6: False
bfs3 for bvs7: True
bfs3 for bvs8: False
bfs3 for bvs9: False
bfs3 for bvs10: False
```

FIG. 9

MEASURING DATA QUALITY

TECHNICAL FIELD

This disclosure relates to data analysis, and more specifically, to techniques for measuring data quality.

BACKGROUND

Data quality may refer to the accuracy, completeness, consistency, timeliness, validity, and/or other aspects of data. By measuring the data quality of an organization's data, the organization may be able to ensure that the data can be reliably used to make informed decisions.

SUMMARY

This disclosure describes techniques for measuring data quality from different perspectives. A computing system may evaluate a set of data against data validation rules to determine whether the set of data conforms to each of the data validation rules. However, the same set of data may be used in different way, and the data quality of the same set of data may differ when viewed via different perspectives.

In accordance with aspects of this disclosure a data quality system may measure different perspectives of data quality of data records in ways that reduce the amount of storage and processing resources to make such data quality measurements. A user may interact with the data quality system to define perspectives under which data records are evaluated for data quality. The user may define, for each perspective, one or more data quality rules associated with the perspective against which data records are evaluated to determine the data quality of the data records under the perspective.

As part of evaluating the data quality of data records, the data quality system may evaluate each data record in a data storage system against a plurality of data validation rules to determine a set of data validation answers for the data record, where each data validation answer may be true or false. The data quality system may store the data validation answer for each data record in a data storage system, such as in the same database as the data records. Because each data validation answer may be true or false, the data quality system may encode each data validation answer as a bit-string, referred to herein as a bit validation score, and may store each bit validation score in the data storage system as an integer value.

To determine the data quality of a data record under a perspective, the data quality system may evaluate a data record against data quality rules associated with the perspective. A data quality rule may specify one or more data validation rules, out of the plurality of data validation rules, that a data record has to meet (e.g., evaluate to true) for the data record to meet the data quality rule. The data quality system may, for a data quality rule, determine a corresponding bit filter score that indicates, as a bitstring, one or more data validation rules, out of the plurality of data validation rules, that a data record has to meet for the data record to meet the data quality rule. The data quality system may determine, based on comparing the corresponding bit validation score of a data record with a bit filter score associated with a data quality rule of a perspective, whether the data record meets the data quality rule associated with the perspective.

To compare the corresponding bit validation score of a data record with a bit filter score associated with a data quality rule of a perspective, the data quality system may perform one or more bitwise operations between the bit filter score associated with the data quality rule of the perspective and the corresponding bit validation score for the data record to determine whether the data record meets the data quality rule associated with the perspective. The data quality system may perform one or more bitwise operations between the bit filter score associated with the data quality rule of the perspective and the corresponding bit validation score for the data record to determine whether, for every bit position having a value of 1 in the bit filter score, whether the corresponding bit position also has a value of 1 in the corresponding bit validation score for the data record. If the data quality system determines that, for every bit position having a value of 1 in the bit filter score, the corresponding bit position also has a value of 1 in the corresponding bit validation score for the data record, the data quality system may determine that the data record meets the data quality rule associated with the perspective.

The techniques of this disclosure may provide certain technical advantages. By encoding data validation answers for data records as bit validation scores and storing integer values of the bit validation scores, the techniques of this disclosure reduce the amount of storage space used to store the data validation answers for the data records, thereby improving the functioning of a data storage system that stores the data validation answers for the data records.

Further, by encoding data validation answers for data records as bit validation scores and by determining bit filter scores associated with data quality rules, the techniques of this disclosure enable a computing system to evaluate data records against data quality rules by performing bitwise operations between bit validation scores for the data records and the bit filter scores associated with the data quality rules. Because processors are able to quickly and efficiently perform bitwise operations, the techniques of this invention may also reduce processing usage and processing time by a computing system to evaluate data records against data quality rules.

In some aspects, the techniques described herein relate to a method including: determining, by one or more processors, and for each of a plurality of data records stored in a data storage system, a corresponding bit validation score, wherein the corresponding bit validation score for a corresponding data record encodes, as bits, a corresponding plurality of data validation answers for the corresponding data record; storing, by the one or more processors and in the data storage system, an integer value of the corresponding bit validation score for each of the plurality of data records; selecting, by the one or more processors, a perspective from a plurality of perspectives, wherein each of the plurality of perspectives is associated with a corresponding one or more data quality rules; performing, by the one or more processors, one or more bitwise operations between a bit filter score associated with a data quality rule of the perspective and the corresponding bit validation score for each of the plurality of data records to determine whether the plurality of data records meet the data quality rule; and outputting, by the one or more processors, an indication of whether the plurality of data records meet the data quality rule.

In some aspects, the techniques described herein relate to a computing system including: memory; and one or more processors coupled to the memory and configured to: determine, for each of a plurality of data records stored in a data storage system, a corresponding bit validation score, wherein the corresponding bit validation score for a corresponding data record encodes, as bits, a corresponding plurality of data validation answers for the corresponding data record; store, in the data storage system, an integer value of the corresponding bit validation score for each of the plurality of data records; select a perspective from a plurality of perspectives, wherein each of the plurality of perspectives is associated with a corresponding one or more data quality rules; perform one or more bitwise operations between a bit filter score associated with a data quality rule of the perspective and the corresponding bit validation score for each of the plurality of data records to determine whether the plurality of data records meet the data quality rule; and output an indication of whether the plurality of data records meet the data quality rule.

In some aspects, the techniques described herein relate to a non-transitory computer-readable medium including instructions that, when executed, cause one or more processors of a computing system to: determine, for each of a plurality of data records stored in a data storage system, a corresponding bit validation score, wherein the corresponding bit validation score for a corresponding data record encodes, as bits, a corresponding plurality of data validation answers for the corresponding data record; store, in the data storage system, an integer value of the corresponding bit validation score for each of the plurality of data records; select a perspective from a plurality of perspectives, wherein each of the plurality of perspectives is associated with a corresponding one or more data quality rules; perform one or more bitwise operations between a bit filter score associated with a data quality rule of the perspective and the corresponding bit validation score for each of the plurality of data records to determine whether the plurality of data records meet the data quality rule; and output an indication of whether the plurality of data records meet the data quality rule.

The details of one or more examples of the disclosure are set forth in the accompanying drawings and the description herein. Other features, objects, and advantages of the disclosure will be apparent from the description and drawings, and from the claims.

BRIEF DESCRIPTION OF THE DRAWINGS

FIG. 9 illustrates an example technique for evaluating data records against data quality rules, in accordance with one or more aspects of the present disclosure.

DETAILED DESCRIPTION

Figure 1:
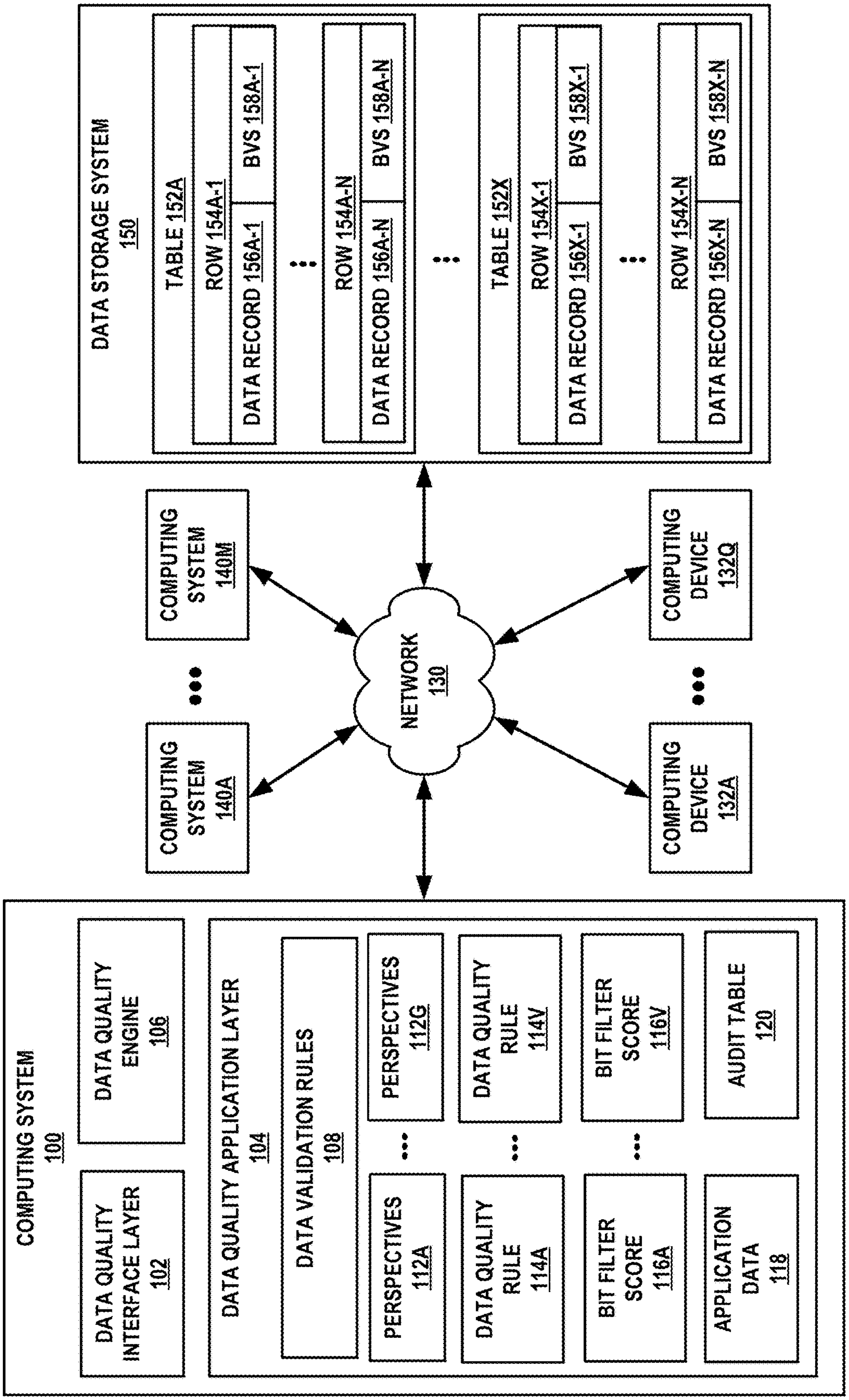
FIG. 1 is a conceptual diagram illustrating an example data quality measurement system, in accordance with one or more aspects of the present disclosure.

This disclosure describes techniques for measuring data quality from different perspectives. A computing system may evaluate a set of data against data validation rules to determine whether the set of data conforms to each of the data validation rules.

However, the same set of data may be used in different ways, and the data quality of the same set of data may differ when viewed via different perspectives. For example, data quality from the perspective of machine learning may differ from data quality from the perspective of an executive dashboard. Further, perspectives may change in real-time, and the data quality of data records under a perspective may change over time. As such, enforcing a single perspective of data quality for data records over time may be infeasible. Further, enforcing a single perspective of data quality may lead to implementation of other formal or informal data quality checks, which may increase complexity in the management of data quality and may be difficult to manage.

In accordance with aspects of this disclosure, a data quality system may measure different perspectives of data quality of data records in ways that reduce the amount of storage and processing resources to make such data quality measurements. A user may interact with the data quality system to define perspectives under which data records are evaluated for data quality. The user may define, for each perspective, one or more data quality rules associated with the perspective against which data records are evaluated to determine the data quality of the data records under the perspective.

As part of evaluating the data quality of data records, the data quality system may evaluate each data record in a data storage system against a plurality of data validation rules to determine a set of data validation answers for the data record, where each data validation answer may be true or false. The data quality system may store the data validation answer for each data record in a data storage system, such as in the same database as the data records. Because each data validation answer may be true or false, data quality system may encode each data validation answer as a bitstring, referred to herein as a bit validation score, and may store each bit validation score in the data storage system as an integer value.

To determine the data quality of a data record under a perspective, the data quality system may evaluate a data record against data quality rules associated with the perspective. A data quality rule may specify one or more data validation rules, out of the plurality of data validation rules, that a data record has to meet (e.g., evaluate to true) for the data record to meet the data quality rule. The data quality system may, for a data quality rule, determine a corresponding bit filter score associated with the data quality rule, which may be a bitstring that specifies one or more data validation rules, out of the plurality of data validation rules, that a data record has to meet for the data record to meet the data quality rule associated with the bit filter score. The data quality system may determine, based on comparing the corresponding bit validation score of a data record with a bit filter score associated with a data quality rule of a perspective, whether the data record meets the data quality rule associated with the perspective.

To compare the corresponding bit validation score of a data record with a bit filter score associated with a data quality rule of a perspective, the data quality system may perform one or more bitwise operations between the bit filter score associated with the data quality rule of the perspective and the corresponding bit validation score for the data record to determine whether the data record meets the data quality rule associated with the perspective. The data quality system may perform one or more bitwise operations between the bit filter score associated with the data quality rule of the perspective and the corresponding bit validation score for the data record to determine whether, for every bit position having a value of 1 in the bit filter score, whether the corresponding bit position also has a value of 1 in the corresponding bit validation score for the data record. If the data quality system determines that, for every bit position having a value of 1 in the bit filter score, the corresponding bit position also has a value of 1 in the corresponding bit validation score for the data record, the data quality system may determine that the data record meets the data quality rule associated with the perspective.

The techniques described in this disclosure provide several technical advantages. By encoding data validation answers for data records as bit validation scores and storing integer values of the bit validation scores, the techniques of this disclosure reduce the amount of storage space used to store the data validation answers for data records, thereby improving the functioning of a data storage system that stores the data validation answers for data records.

Further, by encoding data validation answers for data records as bit validation scores and by determining bit filter scores associated with data quality rules, the techniques of this disclosure enable a computing system to evaluate data records against data quality rules by performing bitwise operations between bit validation scores for the data records and the bit filter scores associated with the data quality rules. Because processors are able to quickly and efficiently perform bitwise operations, the techniques of this invention may also reduce processing usage and processing time by a computing system to evaluate data records against data quality rules.

FIG. 1 is a conceptual diagram illustrating an example system for measuring data quality, in accordance with one or more aspects of the present disclosure. As shown in FIG. 1, computing system 100 is connected to data storage system via network 130 to evaluate the data quality of data stored in data storage system 150. Computing system 100 may represent any suitable computing system including one or more computing devices, such as one or more desktop computers, laptop computers, mainframes, servers, and the like. In some examples, computing system 100 may represent a cloud computing system that provides access to its respective services via a cloud.

Network 130 may be any suitable network that enables communication between computing system 100 and data storage system 150. In some examples, network 130 is an enterprise network for an enterprise associated with computing system 100 and data storage system 150. Network 130 may include a wide-area network such as the Internet, a local-area network (LAN), a personal area network (PAN) (e.g., Bluetooth®), an enterprise network, a wireless network, a cellular network, a telephony network, a Metropolitan area network (e.g., WiFi™, WAN, WiMAX, etc.), one or more other types of networks, or a combination of two or more different types of networks (e.g., a combination of a cellular network and the Internet).

Data storage system 150 is a data store or a collection of data stores that stores an organized collection of data. Examples of data storage system 150 includes one or more databases, a relational database management system, a cloud-based data management system, a hybrid cloud-based data management system, a data warehouse, a data private cloud, and the like. Data storage system 150 may be deployed as a cloud-based system, a hybrid cloud system, an on-premises system, or using any other suitable deployment.

Data storage system 150 may store data records 156A-1 to 156X-N (hereafter "data records 156"), which may be any suitable data for which computing system 100 may evaluate data quality. In the example of FIG. 1, data storage system 150 is illustrated as a database that include tables 152A-152X (hereafter "tables 152"). Tables 152 of data storage system 150 store data records 156 in rows 154A-1 to 154X-N (hereafter "rows 154") of tables 152. Each row of rows 154 may store a data record of data records 156. For example, row 154A-1 of table 152A may store data record 156A-1, and row 154X-1 may store data record 156X-1.

Computing devices 132A-132Q (collectively "computing devices 132") and computing systems 140A-140M (collectively "computing systems 140") may connect to network 130 to communicate with computing system 100 and data storage system 150. Each of computing systems 140 may represent any suitable computing system, such as one or more desktop computers, laptop computers, mainframes, servers, and the like. In some examples, each of computing systems 140 may represent cloud computing systems that provide access to their respective services via a cloud. Computing system 140 may be associated with the same enterprise associated with computing system 100 and data storage system 150 and may access data records 156 stored in data storage system 150. For example, computing systems 140 may access and analyze data records 156 to perform various business analysis tasks for the enterprise.

Each of computing devices 132 may include, but is not limited to, portable or mobile devices such as mobile phones (including smart phones), laptop computers, tablet computers, wearable computing devices such as smart watches or computerized eyewear (including virtual reality headsets, augmented reality headsets, and the like), smart television platforms such as over the top (OTT) devices, cameras, computerize appliances, vehicle head units, etc. Computing devices 132 may communicate with computing system 100 to perform various tasks associated with measuring data quality of data records 156 stored in data storage system 150, as described in further detail below.

Computing system 100 includes data quality interface layer 102, data quality application layer 104, and data quality engine 106. Data quality interface layer 102, data quality application layer 104, and data quality engine 106 may be implemented as software that computing system 100 may execute, or may in some examples include any combination of hardware, firmware, and software.

Data quality interface layer 102 is operable to provide interfaces through which users, devices, systems, applications, and/or services, such as computing devices 132 and computing system 140 may interact with data quality application layer 104 and/or data quality engine 106 to evaluate the data quality of data records 156 in data storage system 150 and/or to receive information regarding the data quality of data records 156 in data storage system 150. Data quality interface layer 102 may provide interfaces in the form of user interfaces (e.g., portals, web pages, etc.) as well as programmatic interfaces, such as application programming interfaces (APIs). In some examples, users, such as administrators may use interfaces provided by data quality interface layer 102 to create connections between computing system 100 and data storage system 150, so that computing system 100 may evaluate the data quality of data records 156 stored in data storage system 150, and to select the data records 156 that computing system 100 may evaluate for data quality.

Data quality application layer 104 is operable to manage evaluating the data quality of data records 156 in data storage system 150. Data quality application layer 104 may store application data 118, which may include connection information for connecting to data storage system 150. Data quality engine 106 and data quality application layer 104 may use such connection information to connect to data storage system 150 to read data from, and write data to, data storage system 150.

Data quality application layer 104 may generate or otherwise determine a plurality of data validation rules 108 against which data records 156 are evaluated as part of determining the data quality of data records 156. In some examples, users may interact with data quality application layer 104 via interfaces provided by data quality interface layer 102 to create and/or update data validation rules 108.

Each data validation rule of data validation rules 108 may evaluate to true or false or to yes or no and may be used to evaluate validity of the data stored in data records 156. Examples of data validation rules 108 include "Is this column null?", "Is this zip code valid?", "Is the gross margin greater than the net margin?", and the like.

Data quality engine 106 is operable to evaluate each of a plurality of data records 156 stored in data storage system 150 against a plurality of data validation rules 108 to determine, for each data record of the plurality of data records, a corresponding plurality of data validation answers. Data quality engine 106 may evaluate a data record against a data validation rule of data validation rules 108 to determine whether the data record meets the data validation rule, and may store an indication of whether the data record meets the data validation rule as a data validation answer associated with the data validation rule. Data quality engine 106 may therefore evaluate a data record against the plurality of data validation rules 108 to determine a corresponding plurality of data validation answers for the data record associated with the plurality of data validation rules. The corresponding plurality of data validation answers for the data record may indicate whether the data record meets each of the plurality of data validation rules.

Data quality engine 106 may determine, for each of the plurality of data records 156, a corresponding bit validation score that encodes, as bits, the corresponding plurality of data validation answers for the corresponding data record. Because each data validation answer for a data record specifies whether the data record meets an associated data validation rule, each data validation answer may be a yes or no answer or a true or false answer. Data quality engine 106 may encode each data validation answer as a bit, where a 1 represents a data validation answer that evaluates to yes or true, and where a 0 represents a data validation answer that evaluates to no or false. Data quality engine 106 may encode the corresponding plurality of data validation answers for a data record as a corresponding bit validation score, which is a bitstring, by concatenating the bits representing each data validation answer for the data record.

Data quality engine 106 may store an integer value of the corresponding bit validation score for each of a plurality of data records 156 in data storage system 150. A bit validation score, by being a bitstring, may have an integer value that is the result of converting the binary value of the bitstring to a decimal number (i.e., a base-ten positional numeral system). For example, a bitstring of 10111 may have an integer value of 23. As such, data quality engine 106 may store the integer value of the corresponding bit validation score for each of a plurality of data records in data storage system 150. Storing integer values of corresponding bit validation scores for data records 156 may reduce the amount of memory needed to store indications of data quality for each of data records 156. Because data storage system 150 may store a large amount of data records, such as millions, hundreds of millions, or more data records, being able to store, for each data record, a corresponding plurality of data validation answers for the corresponding data record as an integer score, the techniques of this disclosure may provide a substantial saving in storage space, thereby providing a significant technical advantage.

As shown in FIG. 1, data quality engine 106 may store bit validation scores (BVS) 158A-1 to 158X-N (hereafter "bit validation scores 158" or "BVS 158") in data storage system 150. Data quality engine 106 may, for each of a plurality of data records 156, store the integer value of the corresponding bit validation score in a column associated with the corresponding data record. For example, data quality engine 106 may, for data record 156A-1 in row 154A-1 of table 152A, store the corresponding bit validation score 158A-1 for data record 156A-1 in the same row 154A-1 of table 152A in an additional column in table 152A.

Data records 156 and data validation rules 108 may change over time. As such, data quality engine 106 may re-evaluate data records 156 against data validation rules 108 to re-determine bit validation scores 158 for data records 156. Data quality engine 106 may periodically re-evaluate data records 156 against data validation rules 108, such as every hour, every day, and the like, and/or may trigger re-evaluation of data records 156 against data validation rules 108 in response to changes to data validation rules 108 and/or data records 156.

In some examples, a user or application may update, via data quality interface layer 102, data validation rules 108 to change data validation rules 108, such as by adding or removing one or more data validation rules from data validation rules 108. In examples where a new data validation rule is added to data validation rules 108, data quality engine 106 may evaluate each of data records 156 against the new data validation rule to determine a corresponding data validation answer for each of data records 156, and encode the corresponding data validation answer for each of data records 156 as a corresponding bit. Data quality engine 106 may update bit validation scores 158 for data records 156 by concatenating the corresponding bit to the corresponding bit validation score for each data records 156, so that the corresponding bit is the most significant bit or the least significant bit of the updated corresponding bit validation score. Data quality engine 106 may therefore update the integer value of the updated corresponding bit validation score for each of data records 156 and store the integer values of the updated bit validation scores 158 in data storage system 150.

Similarly, in examples where a data validation rule is removed from data validation rules 108, data quality engine 106 may remove a bit corresponding to the data validation answer for the data validation rule from each of bit validation scores 158 to generate updated bit validation scores 158 for data records 156. Data quality engine 106 may therefore update the integer value of the updated corresponding bit validation score for each of data records 156 and store the integer values of the updated bit validation scores 158 in data storage system 150.

Computing system 100 may evaluate the data quality of data records 156 according to a plurality of perspectives 112A-112G (hereafter "perspectives 112"). Each perspective is associated with one or more data quality rules out of data quality rules 114A-114V (hereafter "data quality rules 114"), and computing system 100 may measure the data quality of a data record according to a perspective by evaluating the data record against the one or more data quality rules associated with the perspective. Users of computing devices 132 may interact with computing system 100, such as via data quality interface layer 102, to create perspectives 112 and to select one or more of perspectives 112 against which computing system 110 evaluates the data quality of data records 156. For example, a user may use computing device 132A to select a perspective out of perspectives 112, and computing system 100 may evaluate the data quality of data records 156 against the selected perspective.

Each perspective of perspectives 112 is also associated with one or more data records of data records 156 in data storage system 150. That is, one or more data quality rules associated with a perspective may apply to the one or more data records associated with the perspective, but may not apply to other data records not associated with the perspective. In some cases, two or more perspectives may apply to the same one or more data records. For example, each perspective may be associated with one or more of tables 152, so that computing system 100 may evaluate the data records in the one or more tables associated with a perspective against the one or more data quality rules associated with the perspective to measure the data quality of data records 156 according to the perspective.

Data quality application layer 104 may generate or otherwise determine perspectives 112 and data quality rules 114, and may associate perspectives 112 with data quality rules 114, so that each perspective of perspectives 112 is associated with one or more of data quality rules 114. Data quality application layer 104 may also associate each perspective of perspectives 112 with one or more of tables 152 in data storage system 150. In some examples, users may use interfaces provided by data quality interface layer 102 to create perspectives 112 and data quality rules 114, and to associate perspectives 112 to data quality rules 114 and/or to associate perspectives 112 to tables 152 in data storage system 150.

Each data quality rule of data quality rules 114 may specify one or more data validation rules, out of the plurality of data validation rules 108, that a data record has to meet (i.e., evaluate to true or yes) for the data record to meet the data quality rule. Data quality engine 106 may, for each data quality rule of data quality rules 114, generate or determine a corresponding bit filter score associated with the data quality rule, to thereby determine or generate bit filter scores 116A-116V (hereafter "bit filter scores 116") associated with data quality rules 114.

A bit filter score is a bitstring that specifies the specific one or more data validation rules, out of a plurality of data validation rules 108, that a data record has to meet for the data record to meet the data quality rule associated with the bit filter score. Each bit of a bit filter score may be associated with a corresponding data validation rule of the plurality of data validation rules 108 and may have a value that specifies whether a data record has to meet the corresponding data validation rule for the data record to meet the data quality rule. For example, if a plurality of data validation rules 108 includes five data validation rules, a bit filter score of 11100 associated with a data quality rule may indicate that a data record has to meet the first three data validation rules out of the sequence of five data validation rules 108 for the data record to meet the data quality rule.

As described above, each data record of data records 156 in data storage system 150 is associated with a corresponding bit validation score of bit validation scores 158 that encodes a corresponding plurality of data validation answers to the plurality of data validation rules 108 for the corresponding data record. A bit filter score associated with a data quality rule of a perspective and a corresponding bit validation score for a data record may each be a bitstring. As such, computing system 100 may determine, based on comparing the corresponding bit validation score of a data record with a bit filter score associated with a data quality rule of a perspective, whether the data record meets the data quality rule associated with the perspective.

To compare the corresponding bit validation score of a data record with a bit filter score associated with a data quality rule of a perspective, data quality engine 106 may perform one or more bitwise operations between the bit filter score associated with the data quality rule of the perspective and the corresponding bit validation score for the data record to determine whether the data record meets the data quality rule associated with the perspective. Data quality engine 106 may perform one or more bitwise operations between the bit filter score associated with the data quality rule of the perspective and the corresponding bit validation score for the data record to determine whether, for every bit position having a value of 1 in the bit filter score, whether the corresponding bit position also has a value of 1 in the corresponding bit validation score for the data record. If data quality engine 106 determines that, for every bit position having a value of 1 in the bit filter score, the corresponding bit position also has a value of 1 in the corresponding bit validation score for the data record, data quality engine 106 may determine that the data record meets the data quality rule associated with the perspective.

To determine whether, for every bit position having a value of 1 in the bit filter score associated with the perspective, whether the corresponding bit position also has a value of 1 in the corresponding bit validation score for the data record, computing system 100 may perform a bitwise AND operation of the bit filter score associated with the data quality rule and the corresponding bit validation score of a data record and may determine whether the result of the bitwise AND equals the bit filter score associated with the data quality rule. If data quality engine 106 determines that the result of the bitwise AND equals the bit filter score associated with the data quality rule, data quality engine 106 may determine that, for every bit position having a value of 1 in the bit filter score associated with the perspective, the corresponding bit position also has a value of 1 in the corresponding bit validation score for the data record.

As such, data quality engine 106 may perform a bitwise AND of the bit filter score associated with the data quality rule and the corresponding bit validation score of a data record to generate an intermediate result. Data quality engine 106 may compare the intermediate result with the bit filter score to determine whether the intermediate result equals the bit filter score. Data quality engine 106 may, in response to determining that the intermediate result equals the bit filter score, determine that the data record meets the data quality rule associated with the perspective. Similarly, data quality engine 106 may, in response to determining that the intermediate result does not equal the bit filter score, determine that the data record does not meet the data quality rule associated with the perspective. In this way, data quality engine 106 may perform one or more bitwise operations between a bit filter score associated with a data quality rule of a perspective and a corresponding bit validation score for each of the plurality of data records to determine whether the plurality of data records meet the data quality rule.

Modern computing devices and modern processors are able to perform bitwise operations very quickly and with very little processor usage, which reduces the processor utilization that may be needed to determine whether data records 156 meet data quality rules. Given that computing system 100 may have to compare a large number of data records, such as thousands or millions of data records, against a data quality rule to evaluate the data quality of data records 156 against a given perspective, the techniques of this disclosure may provide for a significant reduction in processor usage to evaluate the data quality of data records 156.

Computing system 100 may output an indication of whether a plurality of data records 156 meet a data quality rule. Data quality application layer 104 may store audit table 120 that stores information regarding the data quality of data records 156 of data storage system 150. Data quality application layer 104 may store, in audit table 120, indications of data records 156 and filer perspective data quality scores associated with data records 156. For example, data quality application layer 104 may store, in audit table 120, an association of each data record of data records 156 with one or more perspectives of perspectives 112 and an association of each data record with one or more data quality rules of data quality rules 114.

Data quality application layer 104 may also store, in audit table 120 and for each of data records 156, an indication of whether the data record meets each of the one or more data quality rules associated with the data record. As described above, data quality engine 106 may determine, for a data record, whether the data record meets a data quality rule. Data quality application layer 104 may use data quality engine 106 to determine, for each data record, whether the data record meets each of one or more data quality rules associated with the data record, and may store, in the audit table 120 and for the data record, a corresponding indication of whether the data record meets each of one or more data quality rules associated with the data record.

Data quality application layer 104 may use the information stored in audit table 120 to evaluate the data quality of records 156 according to a plurality of perspectives 112. Because audit table 120 stores information about associations between data records 156 and perspectives 112 and indications of whether each data record meets each of one or more data quality rules associated with the data record, data quality application layer 104 may filter data records 156 by perspective to determine all of the records associated with a perspective and whether data records associated with a perspective meet all of the data quality rules associated with the data perspective.

In some examples, computing system 100 may output, via data quality interface layer 102 to one or more of computing devices 132 and/or one or more of computing systems 140, an indication of whether a plurality of data records 156 meet a data quality rule. For example, users may use computing device 132A to interact with a user interface (e.g., a web portal) provided by data quality interface layer 102 and displayed by computing device 132A to filter data records 156 by perspectives 112 to view whether data records associated with a perspective meet all of the data quality rules associated with the data perspective. For example, the user may select one or more perspectives out of perspectives 112 against which to evaluate data records 156. Computing system 100 may, in response, perform the techniques described in this disclosure to evaluate data records 156 against the selected one or more perspectives, and may output the results of evaluating data records 156 against the selected one or more perspectives for display at, e.g., computing device 132A. In some examples, the user may, based on determining that the data records associated with a perspective does not meet all of the data quality rules associated with the data perspective, take one or more actions to remediate the low data quality of the data records, such as by reviewing the data records for data quality issues, updating data records to fix the data quality issues, generate reports regarding the data quality issues of the data records, and the like.

In another example, applications, services, and/or other computing devices and systems, such as computing systems 140, may programmatically interact with data quality interface layer 102 to request and receive information regarding whether data records associated with a perspective meet all of the data quality rules associated with the data perspective. For example, computing system 140A may select one or more perspectives out of perspectives 112 against which to evaluate data records 156. Computing system 100 may, in response, perform the techniques described in this disclosure to evaluate data records 156 against the selected one or more perspectives, and may output the results of evaluating data records 156 against the selected one or more perspectives to computing system 140A. Computing system 140A may receive such information regarding whether data records associated with a perspective meet all of the data quality rules associated with the data perspective and generate reports regarding the data quality of the data records.

Figure 2:
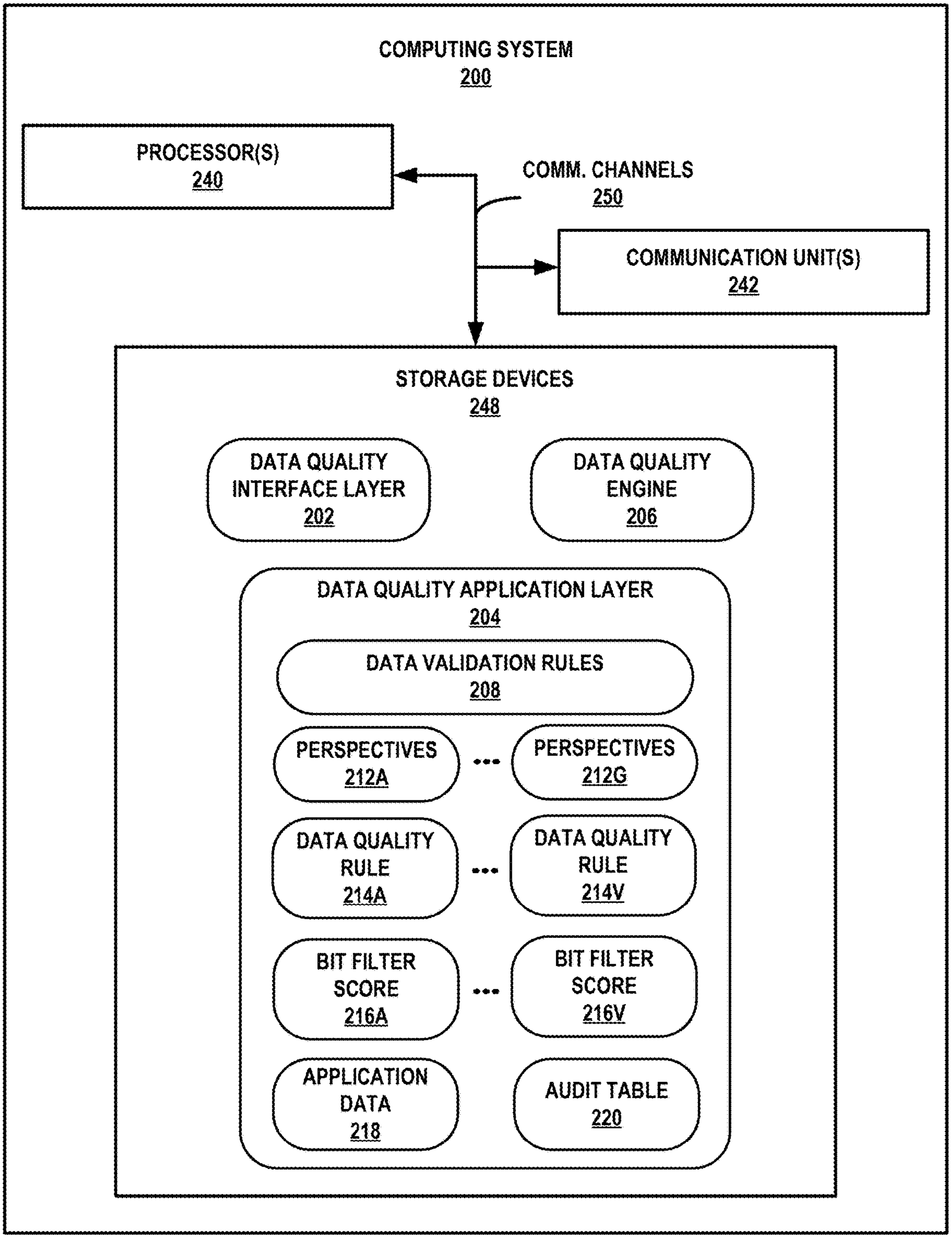
FIG. 2 is a block diagram illustrating an example computing system, in accordance with one or more aspects of the present disclosure.

FIG. 2 is a block diagram illustrating an example computing system, in accordance with one or more aspects of the present disclosure. Computing system 200 of FIG. 2 is described below as an example of computing system 100 of FIG. 1. FIG. 2 illustrates only one particular example of computing system 200, and many other examples of computing system 200 may be used in other instances and may include a subset of the components included in example computing system 200 or may include additional components not shown in FIG. 2. For example, computing system 200 may comprise a cluster of servers, and each of the servers comprising the cluster of servers making up computing system 200 may include all, or some, of the components described herein in FIG. 2, to perform the techniques disclosed herein.

For ease of illustration, computing system 200 is depicted in FIG. 2 as a single computing system. However, in other examples, computing system 200 may be implemented through multiple devices or computing systems distributed across a data center or multiple data centers. For example, computing system 200 (or various modules illustrated in FIG. 2 as included within computing system 200) may be implemented through distributed virtualized compute instances (e.g., virtual machines, containers) of a data center, cloud computing system, server farm, and/or server cluster.

As shown in the example of FIG. 2, computing system 200 includes one or more processors 240, one or more communication units 242, and one or more storage devices 248. One or more storage devices 248 include data quality interface layer 202, data quality application layer 204, and data quality engine 206. Data quality interface layer 202 is an example of data quality interface layer 102 of FIG. 1. Data quality application layer 204 is an example of data quality application layer 104 of FIG. 1. Data quality engine 206 is an example of data quality engine 106 of FIG. 1.

One or more processors 240 may implement functionality and/or execute instructions associated with computing system 200. Examples of one or more processors 240 include application processors, display controllers, auxiliary processors, one or more sensor hubs, and any other hardware configure to function as a processor, a processing unit, or a processing device. Data quality interface layer 202, data quality application layer 204, and data quality engine 206 may be operable by one or more processors 240 to perform various actions, operations, or functions of computing system 200. For example, one or more processors 240 of computing system 200 may retrieve and execute instructions stored by one or more storage devices 248 that cause one or more processors 240 to perform the operations of data quality interface layer 202, data quality application layer 204, and data quality engine. The instructions, when executed by one or more processors 240, may cause computing system 200 to store information within one or more storage devices 248.

One or more communication units 242 of computing system 200 may communicate with external devices via one or more wired and/or wireless networks by transmitting and/or receiving network signals on the one or more networks. Examples of one or more communication units 242 include a network interface card (e.g., such as an Ethernet card), an optical transceiver, a radio frequency transceiver, a global positioning satellite (GPS) receiver, or any other type of device that can send and/or receive information. Other examples of one or more communication units 242 may include short wave radios, cellular data radios, wireless network radios, as well as universal serial bus (USB) controllers.

Communication channels 250 may interconnect each of the components 240, 242, and 248 for inter-component communications (physically, communicatively, and/or operatively). In some examples, communication channels 250 may include a system bus, a network connection, an inter-process communication data structure, or any other method for communicating data.

One or more storage devices 248 within computing system 200 may store information for processing during operation of computing system 200 (e.g., computing system 200 may store data accessed by data quality interface layer 202, data quality application layer 204, data quality engine 206, and data quality measurement application 210 during execution at computing system 200). In some examples, one or more storage devices 248 is a temporary memory, meaning that a primary purpose of one or more storage devices 248 is not long-term storage. In this example, one or more storage devices 248 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

In some examples, one or more storage devices 248 may also include one or more computer-readable storage media. One or more storage devices 248, in some examples, include one or more non-transitory computer-readable storage mediums. One or more storage devices 248 may be configured to store larger amounts of information than typically stored by volatile memory. One or more storage devices 248 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. One or more storage devices 248 may store program instructions and/or information (e.g., data) associated with data quality interface layer 202, data quality application layer 204, and data quality engine 206. One or more storage devices 248 may include a memory configured to store data or other information associated with data quality interface layer 202, data quality application layer 204, and data quality engine 206.

One or more processors 240 are configured to execute data quality interface layer 202 to provide interfaces through which users, devices, systems, applications, and/or services may interact with data quality application layer 204 and/or data quality engine 206 to evaluate the data quality of data records 156 in data storage system 150 connected to computing system 200 and/or to receive information regarding the data quality of data records 156 in data storage system 150. Data quality interface layer 202 may provide interfaces in the form of user interfaces (e.g., portals, web pages, etc.) as well as programmatic interfaces, such as application programming interfaces (APIs). In some examples, users, such as administrators may use interfaces provided by data quality interface layer 202 to create connections between computing system 200 and data storage system 150, so that computing system 200 may evaluate the data quality of data records 156 stored in data storage system 150, and to select the data records 156 that computing system 200 may evaluate for data quality.

Data quality application layer 204 is operable to manage evaluating the data quality of data records 156 in data storage system 150. Data quality application layer 204 may persist application data 218, which may include connection information for connecting to data storage system 150. Data quality engine 206 and data quality application layer 202 may use such connection information to connect to data storage system 150 to read data from, and write data to, data storage system 150.

One or more processors 240 are configured to execute data quality application layer 204 to generate or otherwise determine a plurality of data validation rules 208, which are examples of data validation rules 108 of FIG. 1, against which data records 156 are evaluated as part of determining the data quality of data records 156. In some examples, users may interact with data quality application layer 204 via interfaces provided by data quality interface layer 202 to create and/or update data validation rules 208.

One or more processors 240 are configured to execute data quality engine 206 to evaluate each of a plurality of data records 156 stored in data storage system 150 against a plurality of data validation rules 208 to determine, for each data record of the plurality of data records, a corresponding plurality of data validation answers. Data quality engine 206 may evaluate a data record against a data validation rule of data validation rules 208 to determine whether the data record meets the data validation rule, and may store an indication of whether the data record meets the data validation rule as a data validation answer associated with the data validation rule. Data quality engine 206 may therefore evaluate a data record against the plurality of data validation rules 208 to determine a corresponding plurality of data validation answers for the data record associated with the plurality of data validation rules. The corresponding plurality of data validation answers for the data record may indicate whether the data record meets each of the plurality of data validation rules.

One or more processors 240 are configured to execute data quality engine 206 to determine, for each of the plurality of data records 156, a corresponding bit validation score that encodes, as bits, the corresponding plurality of data validation answers for the corresponding data record. Because each data validation answer for a data record specifies whether the data record meets an associated data validation rule, each data validation answer may be a yes or no answer or a true or false answer. Data quality engine 206 may encode each data validation answer as a bit, where a 1 represents a data validation answer that evaluates to yes or true, and where a 0 represents a data validation answer that evaluates to no or false. Data quality engine 206 may and may encode the corresponding plurality of data validation answers for a data record as a corresponding bit validation score, which is a bitstring, by concatenating the bits representing each data validation answer for the data record.

One or more processors 240 are configured to execute data quality engine 206 to store an integer value of the corresponding bit validation score for each of a plurality of data records 156 in data storage system 150. A bit validation score, by being a bitstring, may have an integer value that is the result of converting the binary value of the bitstring to a decimal number (i.e., a base-ten positional numeral system). Data quality engine 206 may, for each of a plurality of data records 156, store the integer value of the corresponding bit validation score in a column associated with the corresponding data record.

Data quality engine 206 may re-evaluate data records 156 against data validation rules 108 to re-determine bit validation scores 158 for data records 156. Data quality engine 206 may periodically re-evaluate data records 156 against data validation rules 108, such as every hour, every day, and the like, and/or may trigger re-evaluation of data records 156 against data validation rules 208 in response to changes to data validation rules 208 and/or data records 156.

In examples where a new data validation rule is added to data validation rules 208, data quality engine 206 may evaluate each of data records 156 against the new data validation rule to determine a corresponding data validation answer for each of data records 156, and encode the corresponding data validation answer for each of data records 156 as a corresponding bit. Data quality engine 206 may update bit validation scores 158 for data records 156 by concatenating the corresponding bit to the corresponding bit validation score for each data records 156, so that the corresponding bit is the most significant bit or the least significant bit of the updated corresponding bit validation score. Data quality engine 206 may therefore update the integer value of the updated corresponding bit validation score for each of data records 156 and store the integer values of the updated bit validation scores 158 in data storage system 150.

Similarly, in examples where a data validation rule is removed from data validation rules 208, data quality engine 206 remove a bit corresponding to the data validation answer for the data validation rule from each of bit validation scores 158 to generate updated bit validation scores 158 for data records 156. Data quality engine 206 may therefore update the integer value of the updated corresponding bit validation score for each of data records 156 and store the integer values of the updated bit validation scores 158 in data storage system 150.

One or more processors 240 are configured to evaluate the data quality of data records 156 according to a plurality of perspectives 212A-212G (hereafter "perspectives 212"), which are examples of perspectives 112 of FIG. 1. Each perspective is associated with one or more data quality rules out of data quality rules 214A-214V (hereafter "data quality rules 214"), which are examples of data quality rules 114 of FIG. 1, and one or more processors 240 may measure the data quality of a data record according to a perspective by evaluating the data record against the one or more data quality rules associated with the perspective. Each perspective of perspectives 212 is also associated with one or more data records of data records 156 in data storage system 150. In some cases, two or more perspectives may apply to the same one or more data records.

One or more processors 240 are configured to execute data quality application layer 204 to generate or otherwise determine perspectives 212 and data quality rules 214. Data quality application layer 204 may associate perspectives 212 with data quality rules 214, so that each perspective of perspectives 212 is associated with one or more of data quality rules 214. Data quality application layer 204 may also associate each perspective of perspectives 212 with one or more of tables 152 in data storage system 150. In some examples, users may use interfaces provided by data quality interface layer 202 to create perspectives 212 and data quality rules 214, and to associate perspectives 212 to data quality rules 214 and/or to associate perspectives 212 to tables 152 in data storage system 150.

Each data quality rule of data quality rules 214 may specify one or more data validation rules out of the plurality of data validation rules 208 that a data record has to meet (i.e., evaluate to true or yes) for the data record to meet the data quality rule. One or more processors 240 are configured to execute data quality engine 206 to, for each data quality rule of data quality rules 214, generate or determine a corresponding bit filter score associated with the data quality rule, to thereby determine or generate bit filter scores 216A-216V (hereafter "bit filter scores 216"), which are examples of bit filter scores 116 of FIG. 1, associated with data quality rules 214.

One or more processors 240 are configured to execute data quality engine 206 to compare the corresponding bit validation score of a data record with a bit filter score associated with a data quality rule of a perspective. Data quality engine 206 may perform one or more bitwise operations between the bit filter score associated with the data quality rule of the perspective and the corresponding bit validation score for the data record to determine whether the data record meets the data quality rule associated with the perspective. Data quality engine 206 may perform one or more bitwise operations between the bit filter score associated with the data quality rule of the perspective and the corresponding bit validation score for the data record to determine whether, for every bit position having a value of 1 in the bit filter score, whether the corresponding bit position also has a value of 1 in the corresponding bit validation score for the data record. If data quality engine 206 determines that, for every bit position having a value of 1 in the bit filter score, the corresponding bit position also has a value of 1 in the corresponding bit validation score for the data record, data quality engine 206 may determine that the data record meets the data quality rule associated with the perspective.

To determine whether, for every bit position having a value of 1 in the bit filter score associated with the perspective, whether the corresponding bit position also has a value of 1 in the corresponding bit validation score for the data record, data quality engine 206 may perform a bitwise AND operation of the bit filter score associated with the data quality rule and the corresponding bit validation score of a data record and may determine whether the result of the bitwise AND equals the bit filter score associated with the data quality rule. If data quality engine 206 determines that the result of the bitwise AND equals the bit filter score associated with the data quality rule, data quality engine 206 may determine that, for every bit position having a value of 1 in the bit filter score associated with the perspective, the corresponding bit position also has a value of 1 in the corresponding bit validation score for the data record.

As such, data quality engine 106 may perform a bitwise AND of the bit filter score associated with the data quality rule and the corresponding bit validation score of a data record to generate an intermediate result. Data quality engine 206 may compare the intermediate result with the bit filter score to determine whether the intermediate result equals the bit filter score. Data quality engine 206 may, in response to determining that the intermediate result equals the bit filter score, determine that the data record meets the data quality rule associated with the perspective. Similarly, data quality engine 206 may, in response to determining that the intermediate result does not equal the bit filter score, determine that the data record does not meet the data quality rule associated with the perspective. In this way, data quality engine 206 may perform one or more bitwise operations between a bit filter score associated with a data quality rule of a perspective and a corresponding bit validation score for each of the plurality of data records to determine whether the plurality of data records meet the data quality rule.

One or more processors 240 are configured to output an indication of whether a plurality of data records 156 meet a data quality rule. Data quality application layer 204 may persist audit table 220 that stores information regarding the data quality of data records 156 of data storage system 150. Data quality application layer 204 may store, in audit table 120, indications of data records 156 and filer perspective data quality scores associated with data records 156. For example, data quality application layer 204 may store, in audit table 220, an association of each data record of data records 156 with one or more perspectives of perspectives 212 and an association of each data record with one or more data quality rules of data quality rules 214.

Data quality application layer 204 may also store, in audit table 220 and for each of data records 156, an indication of whether the data record meets each of the one or more data quality rules associated with the data record. As described above, data quality engine 206 may determine, for a data record, whether the data record meets a data quality rule. Data quality application layer 204 may use data quality engine 206 to determine, for each data record, whether the data record meets each of one or more data quality rules associated with the data record, and may store, in the audit table 220 and for the data record, a corresponding indication of whether the data record meets each of one or more data quality rules associated with the data record.

Data quality application layer 204 may use the information stored in audit table 220 to evaluate the data quality of records 156 according to a plurality of perspectives 212. Because audit table 220 stores information about associations between data records 156 and perspectives 212 and indications of whether each data record meets each of one or more data quality rules associated with the data record, data quality application layer 204 may filter data records 156 by perspective to determine all of the records associated with a perspective and whether data records associated with a perspective meet all of the data quality rules associated with the data perspective.

One or more processors 240 are configured to execute data quality interface layer 202 to output an indication of whether a plurality of data records 156 meet a data quality rule. For example, users may interact with a user interface (e.g., a web portal) provided by data quality interface layer 202 to filter data records 156 by perspectives 212 to view whether data records associated with a perspective meet all of the data quality rules associated with the data perspective. In another example, applications, services, and/or other computing devices and systems may programmatically interact with data quality interface layer 202 to request for and receive information regarding whether data records associated with a perspective meet all of the data quality rules associated with the data perspective.

Figure 3:
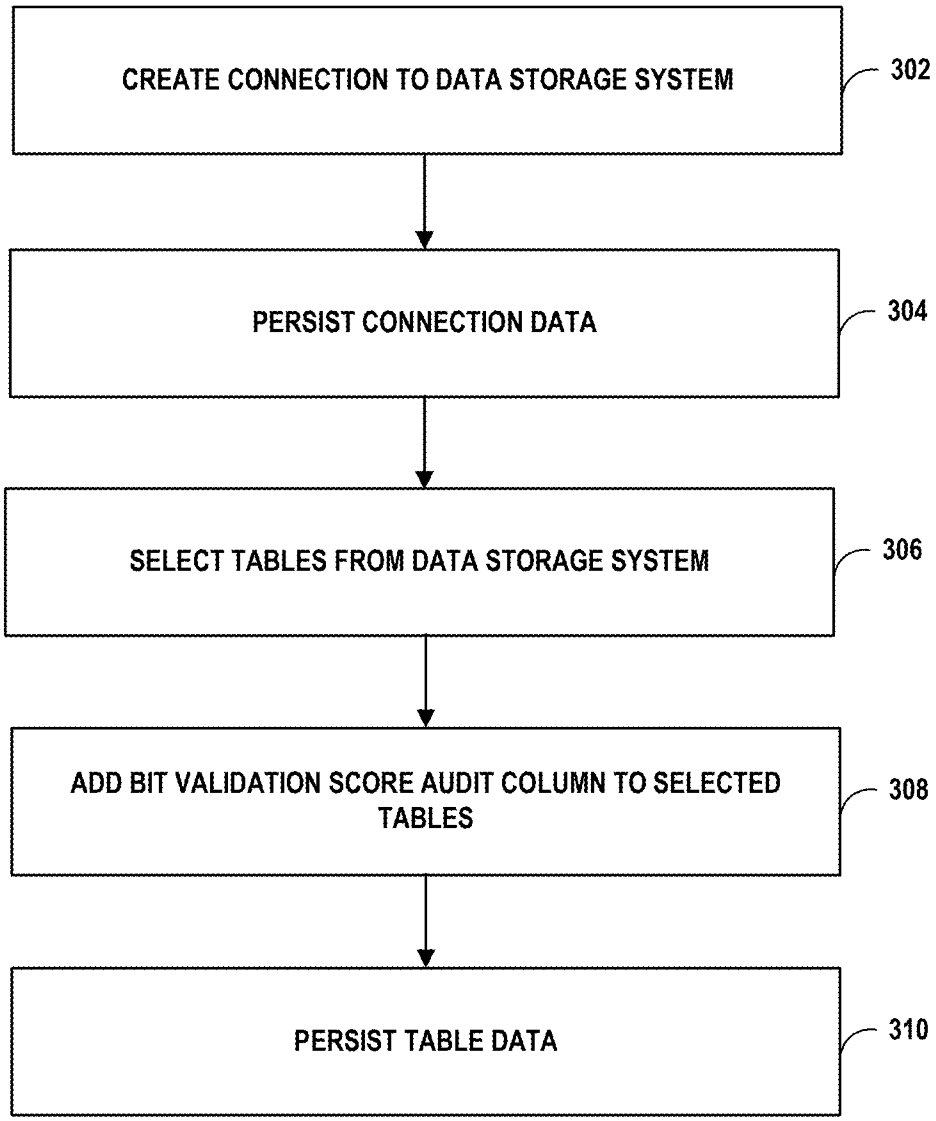
FIG. 3 is a flow diagram illustrating a process of selecting data records that are to be evaluated for data quality from a data storage system, in accordance with one or more aspects of the present disclosure.

FIG. 3 is a flow diagram illustrating a process of selecting data records that are to be evaluated for data quality from data storage system, in accordance with one or more aspects of the present disclosure. FIG. 3 is described below within the context of data storage system 150 of FIG. 1 and computing system 100 of FIG. 1.

As shown in FIG. 3, data quality engine 106 may create a connection to data storage system 150, so computing system 100 can evaluate the data quality of data records 156 stored in data storage system 150 (302). Data quality engine 106 may determine the connection information for connecting to data storage system 150 and may store the connection information in application data 118 in data quality application layer 104 (304).

Data quality engine 106 may also select tables 152 of data records 156 in data storage system 150 that computing system 100 may evaluate for data quality (306). Data quality engine 106 may add a bit validation score audit column to each of the selected tables 152 in data storage system 150 (308). Data quality engine 106 may store information associated with the selected tables 152 in data quality application layer 104, such as by storing indications of the selected tables 152 in application data 118 of data quality application layer 104 (310).

Figure 4:
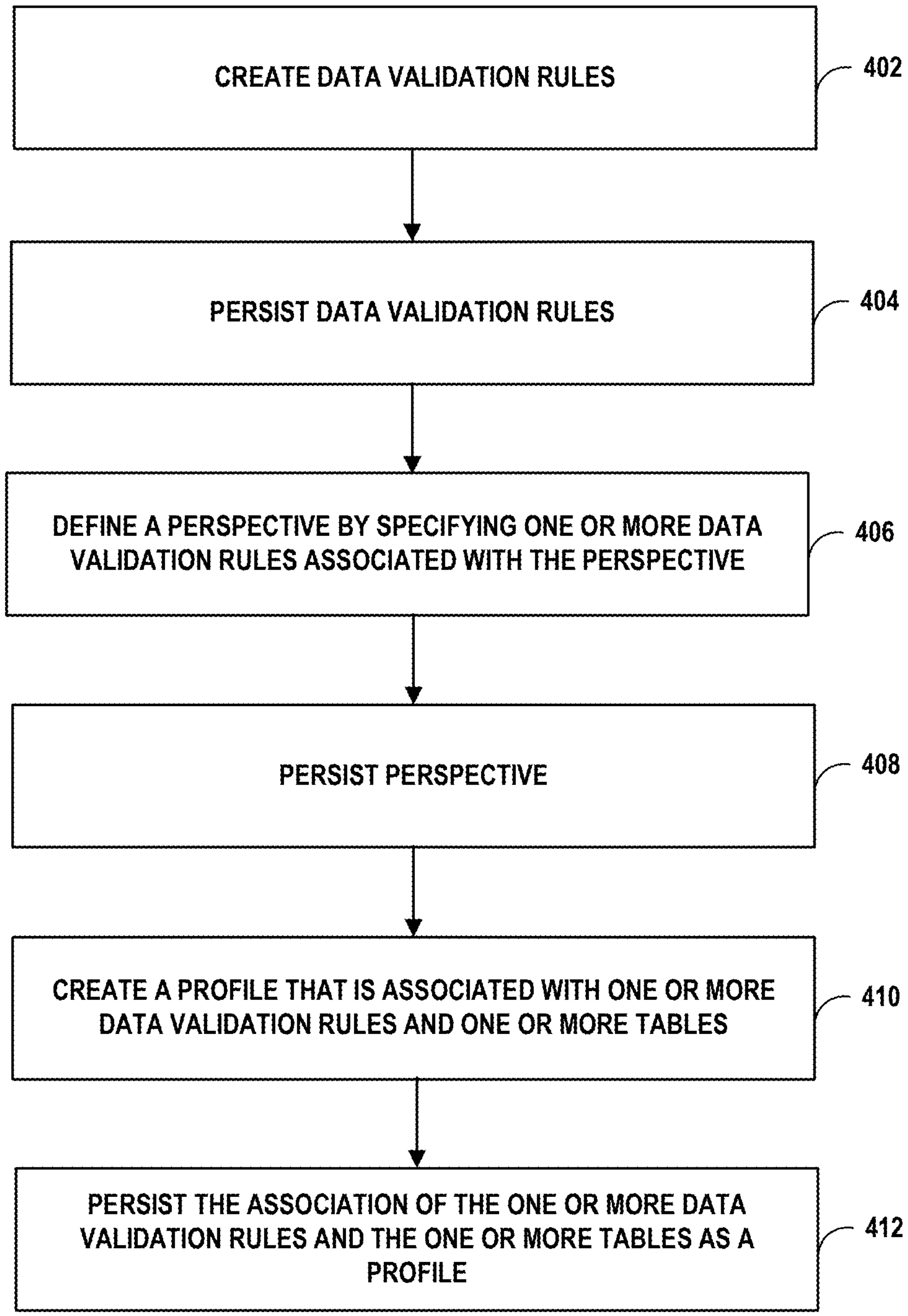
FIG. 4 is a flow diagram illustrating a process of determining perspectives and associated data quality rules, in accordance with one or more aspects of the present disclosure.

FIG. 4 is a flow diagram illustrating a process of determining perspectives and associated data quality rules, in accordance with one or more aspects of the present disclosure. FIG. 4 is described below within the context of data storage system 150 of FIG. 1 and computing system 100 of FIG. 1.

As shown in FIG. 4, a user may interact with data quality application layer 104 via data quality interface layer 102, such as via use of one or more of computing devices 132, to create one or more data quality rules (402). To create a data quality rule, the user may use computing device 132A to specify, via a user interface provided by data quality interface layer 102 and displayed by computing device 132A, one or more data validation rules out of data validation rules 108 that a data record has to meet (i.e., evaluate to true or yes) for the data record to meet the data quality rule. Data quality application layer 104 may persist the one or more data quality rules (404).

The user may also interact with data quality application layer 104 via data quality interface layer 102 to define a perspective, such as by specifying one or more data quality rules associated with the perspective (406). Data quality application layer 104 may persist the perspective (408).

The user may also interact with data quality application layer 104 via data quality interface layer 102 to create profiles that associate data quality rules 114 to tables 152 of data storage system 150. A profile may be an association of one or more of data quality rules 114 to one or more of tables 152 of data storage system 150, such that data quality engine 106 may evaluate the data records 156 of the one or more of tables 152 against the one or more of data quality rules 114.

The user may interact with data quality application layer 104 via data quality interface layer 102 to specify one or more of data quality rules 114 and one or more of tables 152 of data storage system 150 to associate with the profile to thereby create a profile that is associated with the one or more of data quality rules 114 and one or more of tables 152 of data storage system 150 (410). Data quality application layer 104 may persist the association of the one or more of data quality rules 114 and one or more of tables 152 of data storage system 150 as a profile (412).

Figure 5:
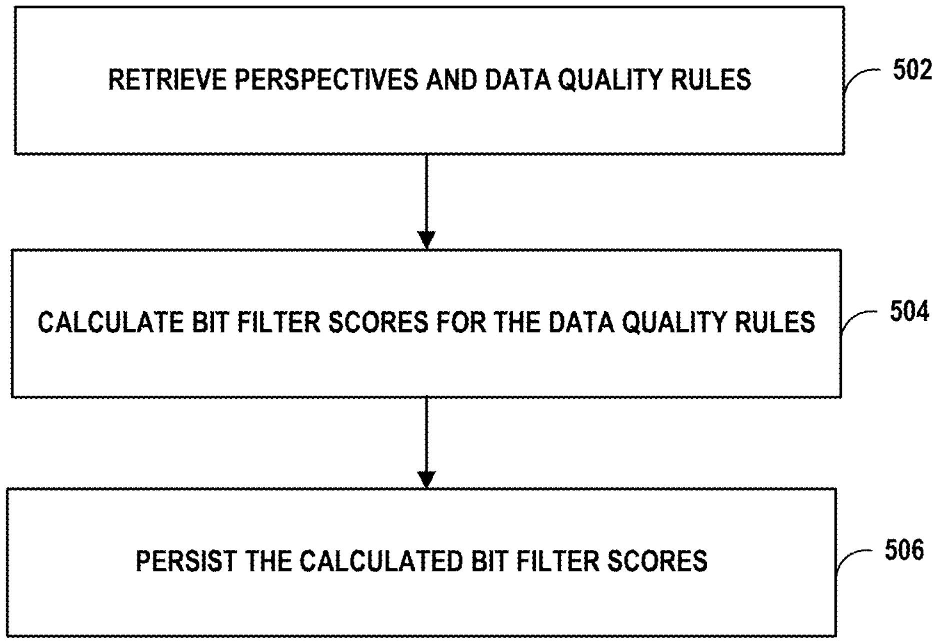
FIG. 5 is a flow diagram illustrating a process of determining bit filter scores for perspectives, in accordance with one or more aspects of the present disclosure.

FIG. 5 is a flow diagram illustrating a process of determining bit filter scores for perspectives, in accordance with one or more aspects of the present disclosure. FIG. 5 is described below within the context of data storage system 150 of FIG. 1 and computing system 100 of FIG. 1.

As shown in FIG. 5, data quality engine 106 may retrieve perspectives 112 and data quality rules 114 from data quality application layer 104 (502) and may calculate bit filter scores 116 for the data quality rules 114 (504). Data quality engine 106 may update existing bit filter scores 116 stored in data quality application layer 104 with the newly calculated bit filter scores 116 or may persist the newly calculated bit filter scores 116 in data quality application layer 104 (506).

Figure 6:
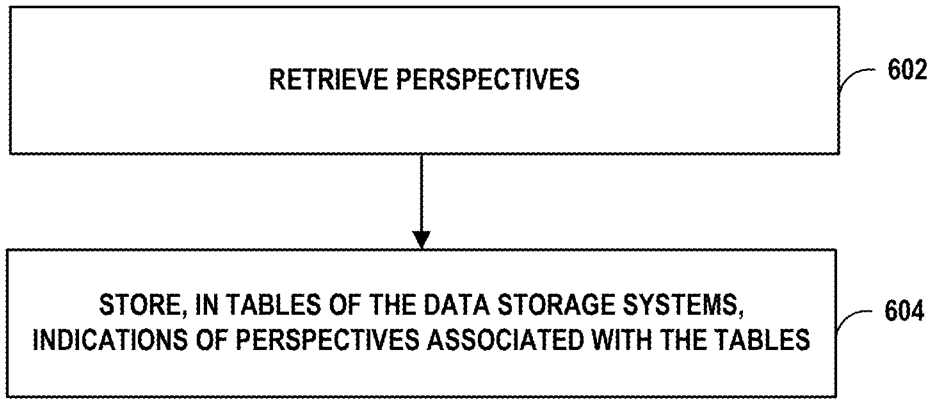
FIG. 6 is a flow diagram illustrating a process of determining filter perspectives, in accordance with one or more aspects of the present disclosure.

FIG. 6 is a flow diagram illustrating a process of determining filter perspectives, in accordance with one or more aspects of the present disclosure. FIG. 6 is described below within the context of data storage system 150 of FIG. 1 and computing system 100 of FIG. 1.

As shown in FIG. 6, data quality engine 106 may retrieve, from data quality application layer 104, perspectives 112 and connection data for connecting to data storage system 150 (602). As described in this disclosure, each perspective may be associated with one or more of data quality rules 114 and one or more of tables 152 of data storage system 150.

Data quality engine 106 may use the connection data for connecting to data storage system 150 to access tables 152 of data storage system 150 and may store, in tables 152, indications of perspectives 112 associated with tables 152 (604). For example, data quality engine 106 may store, in each of a plurality of tables 152, an indication of one or more perspectives associated with the table. In some examples, data quality engine 106 may also store, in each of a plurality of tables 152, an indication of one or more data quality rules associated with each of the perspectives associated with the table.

Figure 7:
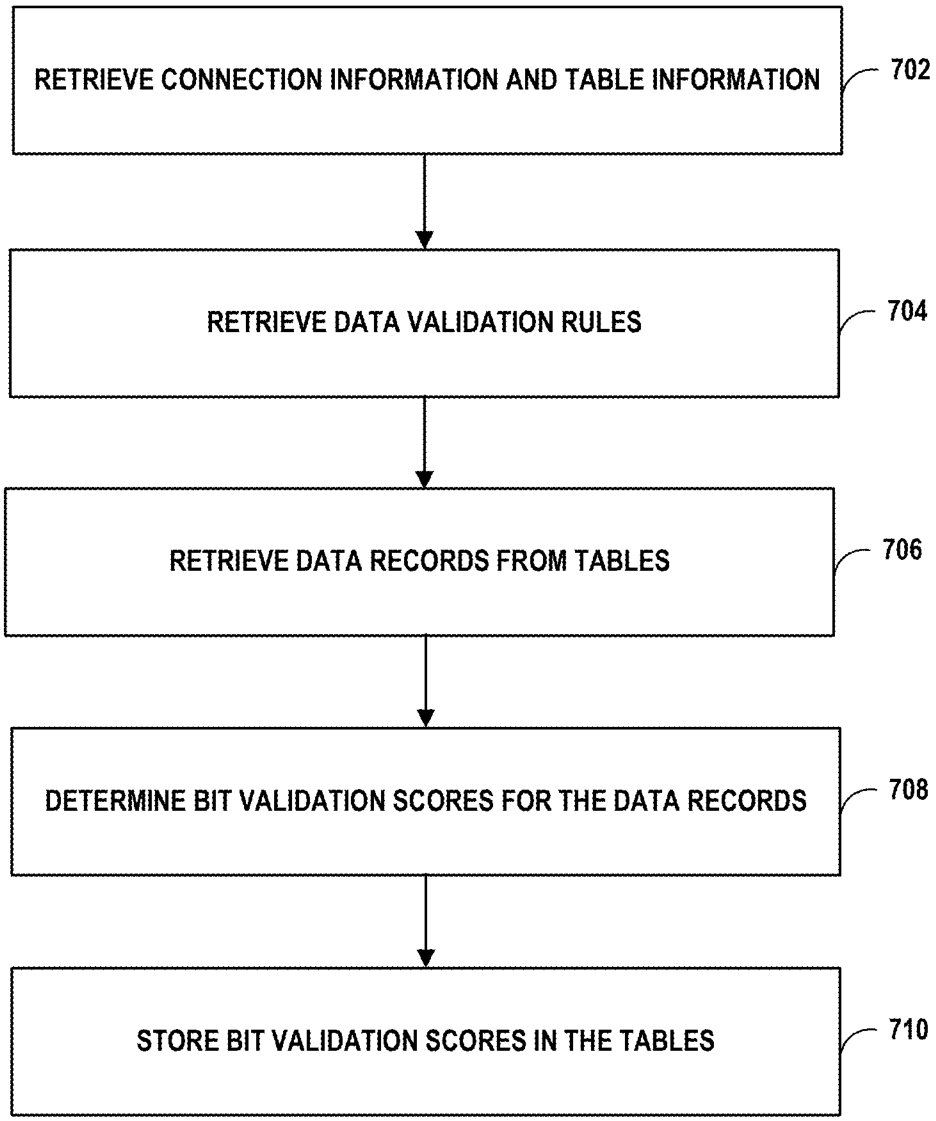
FIG. 7 is a flow diagram illustrating a process of determining bit validation scores for data records, in accordance with one or more aspects of the present disclosure.

FIG. 7 is a flow diagram illustrating a process of determining bit validation scores for data records, in accordance with one or more aspects of the present disclosure. FIG. 7 is described below within the context of data storage system 150 of FIG. 1 and computing system 100 of FIG. 1.

As shown in FIG. 7, data quality engine 106 may retrieve, from data quality application layer 104, application data 118 that include connection information for connecting to data storage system 150 and information regarding tables 152 for which data quality engine 106 may calculate bit validation scores 158 (702). Data quality engine 106 may also retrieve, from data quality application layer 104, data validation rules 108 for calculating bit validation scores 158 (704). Data quality engine 106 may use the information retrieved from data quality application layer 104 to retrieve data records 156 from rows 154 of tables 152 from data storage system 150 (706), and may evaluate the retrieved data records 156 against data validation rules 108 to determine bit validation scores 158 for the retrieved data records 156 (708). Data quality application layer 104 may store the determined bit validation scores 158 in data storage system 150, such as in the bit validation score audit columns in tables 152 of data storage system 150 (710).

Figure 8:
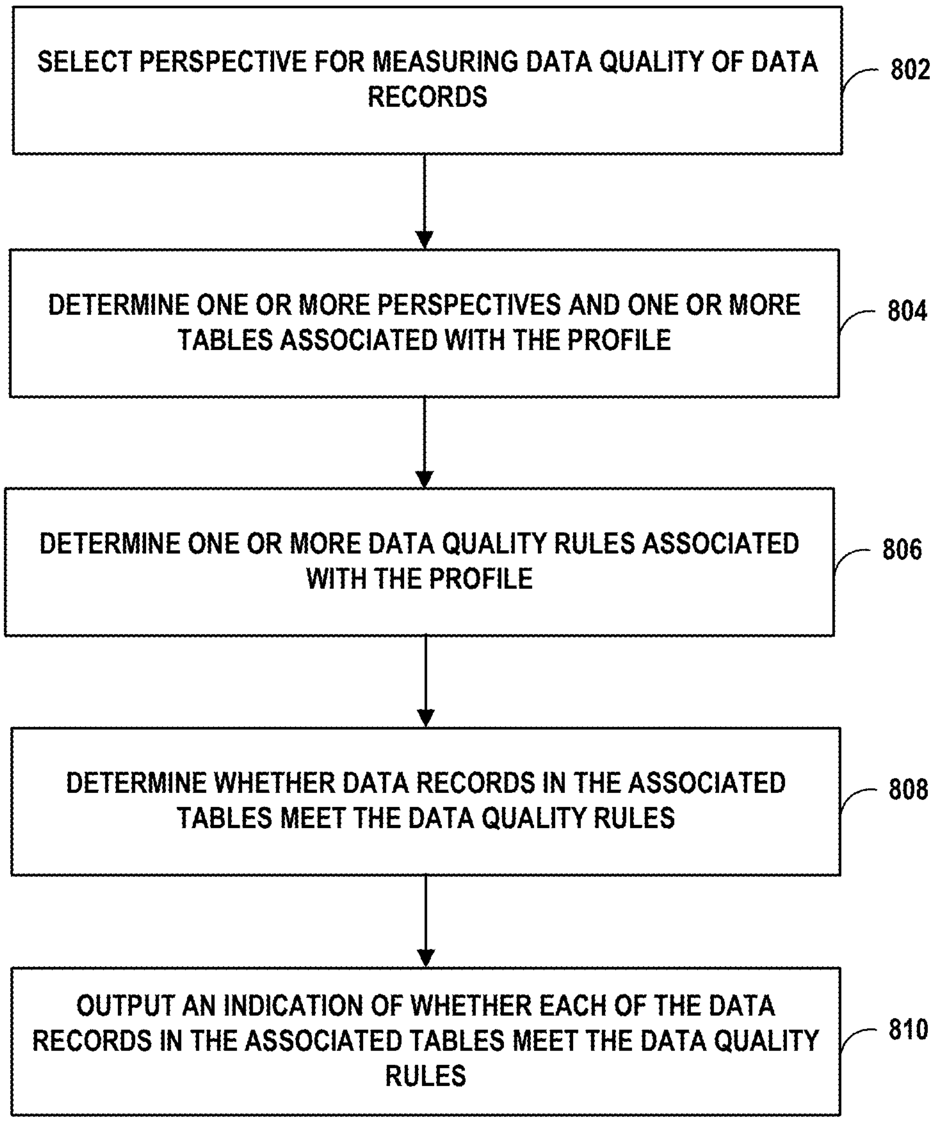
FIG. 8 is a flow diagram illustrating a process of measuring data quality of data records based on the profile, in accordance with one or more aspects of the present disclosure.

FIG. 8 is a flow diagram illustrating a process of measuring data quality of data records based on the profile, in accordance with one or more aspects of the present disclosure. FIG. 8 is described below within the context of data storage system 150 of FIG. 1 and computing system 100 of FIG. 1.

As shown in FIG. 8, a user may interact with computing system 100 via data quality interface layer 102 to select a profile for measuring data quality of data records 156 in data storage system 150 (802). In some examples, the user may be a data scientist that consumes data records 156 for a Jupyter notebook, and the user may select a data science profile for measuring data quality of data records 156. In another example, the user may be a business executive that consumes data records 156 for a Tableau report, and the user may select a business profile for measuring data quality of data records 156.

Data quality engine 106 may determine one or more perspectives associated with the profile and determine tables 152 associated with the perspective (804). As described in this disclosure, a profile may be associated with one or more specific tables of tables 152 in data storage system 150. Such associations between profiles and perspectives may be persisted in data quality engine 106 and/or in tables 152 of data storage system 150.

Data quality engine 106 may also determine one or more data quality rules associated with the profile (806). As described in this disclosure, a profile may be associated with one or more perspectives, and each perspective may be associated with one or more data quality rules of data quality rules 114. Such associations between perspectives and data quality rules may be persisted in data quality engine 106 and/or in tables 152 of data storage system 150.

Data quality engine 106 may determine whether the data records 156 in the tables 152 associated with the profile meet the data quality rules associated with the profile (808). Data quality engine 106 may perform bitwise operations between bit validation scores 158 associated with the selected data records 156 and bit filter scores 116 for the data quality rules associated with the profile to determine whether each of the selected data records 156 meets each of the data quality rules associated with the profile.

Data quality interface layer 102 may output an indication of whether each of the data records 156 in the tables 152 associated with the profile meets each of the data quality rules associated with the profile (810). In some examples, data quality interface layer 102 may output a user interface, such as in the form of a portal, that presents a graphical and/or textual indication of whether each of the data records 156 in the tables 152 associated with the profile meets each of the data quality rules associated with the profile. In some examples, data quality interface layer 102 may programmatically output an indication of whether each of the data records 156 in the tables 152 associated with the profile meets each of the data quality rules associated with the profile, such as to a Jupyter notebook or a Tableau report.

FIG. 9 illustrates an example technique for evaluating data records against data quality rules, in accordance with one or more aspects of the present disclosure. FIG. 9 is described below within the context of data storage system 150 of FIG. 1 and computing system 100 of FIG. 1.

In the example of FIG. 9, three perspectives are each associated with a corresponding example data quality rule:

Perspective 1:[False, False, False, True, False, False, True, True, False, False];

Perspective 2:[True, True, True, True, False, False, True, False, False, False]; and Perspective 3:[False, False, False, True, True, True, False, True, True, True].

The data quality rules of the three perspectives can each be encoded as a bit filter score as follows:

bit filter score 1 (bfs1): 0001001100;

bit filter score 2 (bfs2): 1111001000; and bit filter score 3 (bfs3): 0001110111.

In the example of FIG. 9, ten rows of data records having the following bit validation scores:

row 1 bit validation score (bvs1): [True, False, False, False, True, False, False, True, False, False] =1000100100;

row 2 bit validation score (bvs2): [True, True, False, True, True, False, True, True, False, False]=1101101100;

row 3 bit validation score (bvs3): [True, True, False, True, True, False, True, True, False, False]=1101101100;

row 4 bit validation score (bvs4): [True, False, False, True, True, False, True, True, False, False] =1001101100;

row 5 bit validation score (bvs5): [True, True, False, True, True, True, True, True, True, True]=1101111111;

row 6 bit validation score (bvs6): [True, True, False, True, True, False, True, True, False, False]=1101101100;

row 7 bit validation score (bvs7): [True, True, False, True, True, False, True, True, False, False]=1101101100;

row 8 bit validation score (bvs8): [True, True, False, True, True, False, True, True, False, True]=1101101101;

row 9 bit validation score (bvs9): [True, True, False, True, True, False, True, True, False, False]=1101101100; and row 10 bit validation score (bvs10): [True, True, False, True, True, False, True, True, False, False] =1101101100.

As described above, computing system 100 may store the bit validation scores for the rows of data records as integer values:

bvs1 integer value: 548;

bvs2 integer value: 364;

bvs3 integer value: 876;

bvs4 integer value: 620;

bvs5 integer value: 895;

bvs6 integer value: 1005;

bvs7 integer value: 383;

bvs8 integer value: 973;

bvs9 integer value: 860; and bvs10 integer value: 878.

As shown in FIG. 9, data quality engine 106 may evaluate the ten rows of data records against the example data quality rules of the three perspectives. To evaluate a data record against a data quality rule, data quality engine 106 may perform a bitwise AND operation of the bit filter score for the data quality rule with the bit validation score for the data record and compare the result of the bitwise AND with the bit filter score for the data quality rule to determine whether the data record meets the data quality rule. For example, to evaluate the data record in the example row 1 against the data quality rule associated with perspective 1, data quality engine 106 may perform a bitwise AND of bit filter score 1 (bfs1) with row 1 bit validation score (bvs1) and compare the result of the bitwise AND with bfs1 to determine whether the data record in row 1 meets the data quality rule, as follows: bfs1==bfs1 & bvs1.

As can be seen, in perspective 1 evaluation 902, only the data records in row 5 and row 7 out of the ten rows meet the data quality rule associated with perspective 1. In perspective 2 evaluation 904, only the data records in row 6 and row 8 out of the ten rows meet the data quality rule associated with perspective 2. In perspective 3 evaluation 906, only the data records in row 5 and row 7 out of the ten rows meet the data quality rule associated with perspective 3.

Figure 10:
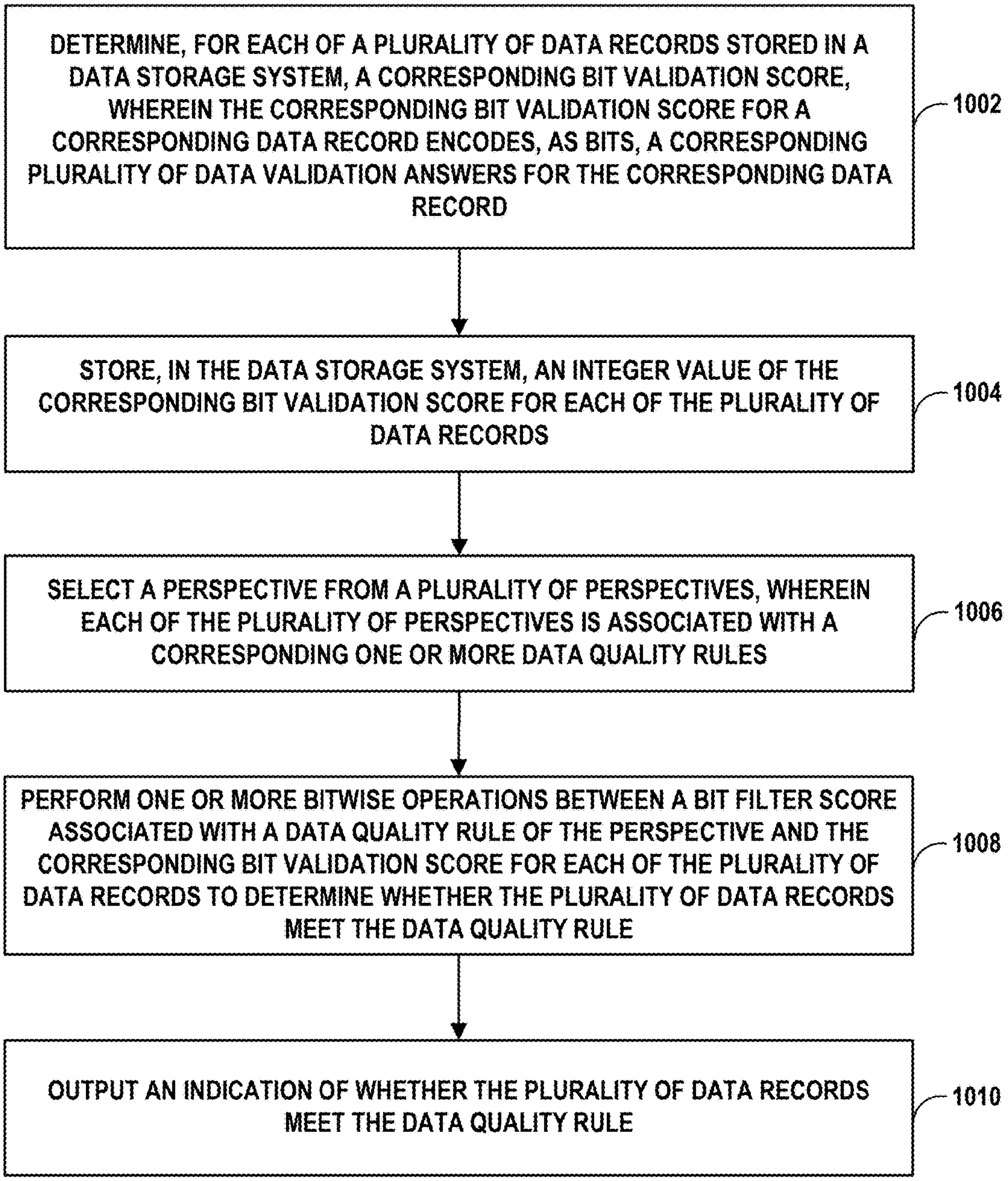
FIG. 10 is a flow diagram illustrating operations performed by an example computing system, in accordance with one or more aspects of the present disclosure.

FIG. 10 is a flow diagram illustrating operations performed by an example computing system, in accordance with one or more aspects of the present disclosure. FIG. 10 is described below within the context of computing system 200 of FIG. 2. In other examples, operations described in FIG. 10 may be performed by one or more other components, modules, systems, or devices. Further, in other examples, operations described in connection with FIG. 10 may be merged, performed in a difference sequence, omitted, or may encompass additional operations not specifically illustrated or described.

In the process illustrated in FIG. 10, and in accordance with one or more aspects of the present disclosure, one or more processors 240 may determine, for each of a plurality of data records 156 stored in a data storage system 150, a corresponding bit validation score, wherein the corresponding bit validation score for a corresponding data record encodes, as bits, a corresponding plurality of data validation answers for the corresponding data record (1002).

In some examples, to determine, for each of the plurality of data records 156 stored in the data storage system, the corresponding bit validation score, one or more processors 240 may evaluate a data record against a plurality of data validation rules 108 to determine a plurality of data validation answers for the data record, wherein the plurality of data validation answers for the data record indicate whether the data record meets each of the plurality of data validation rules 108. One or more processors 240 may encode each data validation answer of the plurality of data validation answers as a bit value that indicates whether the data validation answer evaluates to true or false to generate a plurality of bit values. One or more processors 240 may concatenate the plurality of bit values to generate the corresponding bit validation score for the data record. One or more processors 240 may generate an integer value of the corresponding bit validation score.

In some examples, one or more processors 240 may evaluate the data record against an additional one or more data validation rules to determine one or more additional data validation answers for the data record. One or more processors 240 may encode each additional data validation answer of the one or more additional data validation answers as an additional bit value that indicates whether the data validation answer evaluates to true or false to generate one or more additional bit values. One or more processors 240 may concatenate the one or more additional bit values to the corresponding bit validation score for the data record to generate an updated corresponding bit validation score for the data record. One or more processors 240 may generate an integer value of the updated corresponding bit validation score.

One or more processors 240 may store, in the data storage system 150, an integer value of the corresponding bit validation score for each of the plurality of data records (1004). In some examples, the plurality of data records 156 comprise a plurality of rows 154 of one or more tables 152 in the data storage system 150, and to store the corresponding bit validation score for each of the plurality of data records as the integer value, one or more processors 240 may store the corresponding bit validation score for each of the plurality of data records 156 as the integer value in a column of the one or more tables 152.

One or more processors 240 may select a perspective from a plurality of perspectives 112, wherein each of the plurality of perspectives 112 is associated with a corresponding one or more data quality rules 114 (1006). One or more processors 240 may perform one or more bitwise operations between a bit filter score associated with a data quality rule of the perspective and the corresponding bit validation score for each of the plurality of data records 156 to determine whether the plurality of data records 156 meet the data quality rule (1008). One or more processors 240 output an indication of whether the plurality of data records 156 meet the data quality rule (1010).

In some examples, to perform the one or more bitwise operations between the bit filter score associated with the data quality rule and the corresponding bit validation score for each of the plurality of data records 156 to determine whether the plurality of data records 156 meet the data quality rule, one or more processors 240 may perform a bitwise AND operation of the bit filter score associated with the data quality rule and the corresponding bit validation score of a data record to generate an intermediate result. One or more processors 240 may determine whether the data record meets the data quality rule based on comparing the bit filter score associated with the data quality rule to the intermediate result. In some examples, the bit filter score associated with the data quality rule is a bitstring that specifies one or more data validation answers out of the corresponding plurality of data validation answers for the data record that have to be true for the data record to meet the data quality rule.

In some examples, one or more processors 240 may select a second perspective from the plurality of perspectives 112, wherein the second perspective is associated with a second data quality rule. One or more processors 240 may perform a second one or more bitwise operations between a second bit filter score associated with the second data quality rule and the corresponding bit validation score for each of the plurality of data records 156 to determine whether the plurality of data records meet the second data quality rule. One or more processors 240 may output an indication of whether the plurality of data records 156 meet the second data quality rule.

For processes, apparatuses, and other examples or illustrations described herein, including in any flowcharts or flow diagrams, certain operations, acts, steps, or events included in any of the techniques described herein can be performed in a different sequence, may be added, merged, or left out altogether (e.g., not all described acts or events are necessary for the practice of the techniques). Moreover, in certain examples, operations, acts, steps, or events may be performed concurrently, e.g., through multi-threaded processing, interrupt processing, or multiple processors, rather than sequentially. Further certain operations, acts, steps, or events may be performed automatically even if not specifically identified as being performed automatically. Also, certain operations, acts, steps, or events described as being performed automatically may be alternatively not performed automatically, but rather, such operations, acts, steps, or events may be, in some examples, performed in response to input or another event.

The disclosures of all publications, patents, and patent applications referred to herein are hereby incorporated by reference. To the extent that any such disclosure material that is incorporated by reference conflicts with the present disclosure, the present disclosure shall control.

For ease of illustration, only a limited number of devices (e.g., computing system 100, computing system 200, as well as others) are shown within the Figures and/or in other illustrations referenced herein. However, techniques in accordance with one or more aspects of the present disclosure may be performed with many more of such systems, components, devices, modules, and/or other items, and collective references to such systems, components, devices, modules, and/or other items may represent any number of such systems, components, devices, modules, and/or other items.

The Figures included herein each illustrate at least one example implementation of an aspect of this disclosure. The scope of this disclosure is not, however, limited to such implementations. Accordingly, other example or alternative implementations of systems, methods or techniques described herein, beyond those illustrated in the Figures, may be appropriate in other instances. Such implementations may include a subset of the devices and/or components included in the Figures and/or may include additional devices and/or components not shown in the Figures.

The detailed description set forth above is intended as a description of various configurations and is not intended to represent the only configurations in which the concepts described herein may be practiced. The detailed description includes specific details for the purpose of providing a sufficient understanding of the various concepts. However, these concepts may be practiced without these specific details. In some instances, well-known structures and components are shown in block diagram form in the referenced figures in order to avoid obscuring such concepts.

Accordingly, although one or more implementations of various systems, devices, and/or components may be described with reference to specific Figures, such systems, devices, and/or components may be implemented in a number of different ways. For instance, one or more devices illustrated herein as separate devices may alternatively be implemented as a single device; one or more components illustrated as separate components may alternatively be implemented as a single component. Also, in some examples, one or more devices illustrated in the Figures herein as a single device may alternatively be implemented as multiple devices; one or more components illustrated as a single component may alternatively be implemented as multiple components. Each of such multiple devices and/or components may be directly coupled via wired or wireless communication and/or remotely coupled via one or more networks. Also, one or more devices or components that may be illustrated in various Figures herein may alternatively be implemented as part of another device or component not shown in such Figures. In this and other ways, some of the functions described herein may be performed via distributed processing by two or more devices or components.

Further, certain operations, techniques, features, and/or functions may be described herein as being performed by specific components, devices, and/or modules. In other examples, such operations, techniques, features, and/or functions may be performed by different components, devices, or modules. Accordingly, some operations, techniques, features, and/or functions that may be described herein as being attributed to one or more components, devices, or modules may, in other examples, be attributed to other components, devices, and/or modules, even if not specifically described herein in such a manner.

Although specific advantages have been identified in connection with descriptions of some examples, various other examples may include some, none, or all of the enumerated advantages. Other advantages, technical or otherwise, may become apparent to one of ordinary skill in the art from the present disclosure. Further, although specific examples have been disclosed herein, aspects of this disclosure may be implemented using any number of techniques, whether currently known or not, and accordingly, the present disclosure is not limited to the examples specifically described and/or illustrated in this disclosure.

In one or more examples, the functions described may be implemented in hardware, software, firmware, or any combination thereof. If implemented in software, the functions may be stored, as one or more instructions or code, on and/or transmitted over a computer-readable medium and executed by a hardware-based processing unit. Computer-readable media may include computer-readable storage media, which corresponds to a tangible medium such as data storage media, or communication media including any medium that facilitates transfer of a computer program from one place to another (e.g., pursuant to a communication protocol). In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, or optical disk storage, magnetic disk storage, or other magnetic storage devices, flash memory, or any other medium that can be used to store desired program code in the form of instructions or data structures and that can be accessed by a computer. Also, any connection may properly be termed a computer-readable medium. For example, if instructions are transmitted from a website, server, or other remote source using a wired (e.g., coaxial cable, fiber optic cable, twisted pair) or wireless (e.g., infrared, radio, and microwave) connection, then the wired or wireless connection is included in the definition of medium. It should be understood, however, that computer-readable storage media and data storage media do not include connections, carrier waves, signals, or other transient media, but are instead directed to non-transient, tangible storage media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the terms "processor" or "processing circuitry" as used herein may each refer to any of the foregoing structure or any other structure suitable for implementation of the techniques described. In addition, in some examples, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, a mobile or non-mobile computing device, a wearable or non-wearable computing device, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperating hardware units, including one or more processors as described above, in conjunction with suitable software and/or firmware.

What is claimed is:

1. A method comprising:

determining, by one or more processors, and for each of a plurality of data records stored in a data storage system, a corresponding bit validation score, wherein the corresponding bit validation score for a corresponding data record encodes, as bits, a corresponding plurality of data validation answers for the corresponding data record, the corresponding plurality of data validation answers indicating whether the corresponding data record meets each of a plurality of data validation rules;

storing, by the one or more processors and in the data storage system, an integer value of the corresponding bit validation score for each of the plurality of data records;

selecting, by the one or more processors, a perspective from a plurality of perspectives, wherein each of the plurality of perspectives is associated with a corresponding one of one or more data quality rules;

performing, by the one or more processors, one or more bitwise operations between a bit filter score associated with a data quality rule of the perspective and the corresponding bit validation score for each of the plurality of data records to determine whether the plurality of data records meet the data quality rule, wherein the bit filter score associated with the data quality rule is a bitstring that specifies one or more data validation answers out of the corresponding plurality of data validation answers for the corresponding data record that have to be true for the corresponding data record to meet the data quality rule; and outputting, by the one or more processors and via a data quality interface layer to one or more computing devices, an indication of whether the plurality of data records meet the data quality rule.

2. The method of claim 1, wherein determining, for each of the plurality of data records stored in the data storage system, the corresponding bit validation score further comprises:

evaluating, by the one or more processors, the corresponding data record against the plurality of data validation rules to determine the corresponding plurality of data validation answers for the corresponding data record, wherein the corresponding plurality of data validation answers for the corresponding data record indicate whether the corresponding data record meets each of the plurality of data validation rules;

encoding, by the one or more processors, each data validation answer of the corresponding plurality of data validation answers as a bit value that indicates whether the data validation answer evaluates to true or false to generate a plurality of bit values;

concatenating, by the one or more processors, the plurality of bit values to generate the corresponding bit validation score for the corresponding data record; and generating, by the one or more processors, an integer value of the corresponding bit validation score.

3. The method of claim 2, further comprising:

evaluating, by the one or more processors, the corresponding data record against an additional one or more data validation rules to determine a corresponding one or more additional data validation answers for the corresponding data record;

encoding, by the one or more processors, each additional data validation answer of the corresponding one or more additional data validation answers as an additional bit value that indicates whether the data validation answer evaluates to true or false to generate one or more additional bit values;

concatenating, by the one or more processors, the one or more additional bit values to the corresponding bit validation score for the corresponding data record to generate an updated corresponding bit validation score for the corresponding data record; and generating, by the one or more processors, an integer value of the updated corresponding bit validation score.

4. The method of claim 1, wherein the plurality of data records comprises a plurality of rows of one or more tables in the data storage system, and wherein storing the corresponding bit validation score for each of the plurality of data records as the integer value further comprises:

storing, by the one or more processors, the corresponding bit validation score for each of the plurality of data records as the integer value in a column of the one or more tables.

5. The method of claim 1, wherein performing the one or more bitwise operations between the bit filter score associated with the data quality rule and the corresponding bit validation score for each of the plurality of data records to determine whether the plurality of data records meet the data quality rule further comprises:

performing, by the one or more processors, a bitwise AND operation of the bit filter score associated with the data quality rule and the corresponding bit validation score of the corresponding data record to generate an intermediate result; and determining, by the one or more processors, whether the corresponding data record meets the data quality rule based on comparing the bit filter score associated with the data quality rule to the intermediate result.

6. The method of claim 1, further comprising:

selecting, by the one or more processors, a second perspective from the plurality of perspectives, wherein the second perspective is associated with a second data quality rule;

performing, by the one or more processors, a second one or more bitwise operations between a second bit filter score associated with the second data quality rule and the corresponding bit validation score for each of the plurality of data records to determine whether the plurality of data records meet the second data quality rule; and outputting, by the one or more processors and via the data quality interface layer to the one or more computing devices, an indication of whether the plurality of data records meet the second data quality rule.

7. A computing system comprising:

memory; and one or more processors coupled to the memory and configured to:

determine, for each of a plurality of data records stored in a data storage system, a corresponding bit validation score, wherein the corresponding bit validation score for a corresponding data record encodes, as bits, a corresponding plurality of data validation answers for the corresponding data record, the corresponding plurality of data validation answers indicating whether the corresponding data record meets each of a plurality of data validation rules;

store, in the data storage system, an integer value of the corresponding bit validation score for each of the plurality of data records;

select a perspective from a plurality of perspectives, wherein each of the plurality of perspectives is associated with a corresponding one of one or more data quality rules;

perform one or more bitwise operations between a bit filter score associated with a data quality rule of the perspective and the corresponding bit validation score for each of the plurality of data records to determine whether the plurality of data records meet the data quality rule, wherein the bit filter score associated with the data quality rule is a bitstring that specifies one or more data validation answers out of the corresponding plurality of data validation answers for the corresponding data record that have to be true for the corresponding data record to meet the data quality rule; and output, via data quality interface layer to one or more computing devices, an indication of whether the plurality of data records meet the data quality rule.

8. The computing system of claim 7, wherein to determine, for each of the plurality of data records stored in the data storage system, the corresponding bit validation score, the one or more processors are further configured to:

evaluate the corresponding data record against a plurality of data validation rules to determine the corresponding plurality of data validation answers for the corresponding data record, wherein the corresponding plurality of data validation answers for the corresponding data record indicate whether the corresponding data record meets each of the plurality of data validation rules;

encode each data validation answer of the corresponding plurality of data validation answers as a bit value that indicates whether the data validation answer evaluates to true or false to generate a plurality of bit values;

concatenate the plurality of bit values to generate the corresponding bit validation score for the corresponding data record; and generate an integer value of the corresponding bit validation score.

9. The computing system of claim 8, wherein the one or more processors are further configured to:

evaluate the corresponding data record against an additional one or more data validation rules to determine a corresponding one or more additional data validation answers for the corresponding data record;

encode each additional data validation answer of the corresponding one or more additional data validation answers as an additional bit value that indicates whether the data validation answer evaluates to true or false to generate one or more additional bit values;

concatenate the one or more additional bit values to the corresponding bit validation score for the corresponding data record to generate an updated corresponding bit validation score for the corresponding data record; and generate an integer value of the updated corresponding bit validation score.

10. The computing system of claim 7, wherein the plurality of data records comprises a plurality of rows of one or more tables in the data storage system, and wherein to store the corresponding bit validation score for each of the plurality of data records as the integer value, the one or more processors are further configured to:

store the corresponding bit validation score for each of the plurality of data records as the integer value in a column of the one or more tables.

11. The computing system of claim 7, wherein to perform the one or more bitwise operations between the bit filter score associated with the data quality rule and the corresponding bit validation score for each of the plurality of data records to determine whether the plurality of data records meet the data quality rule, the one or more processors are further configured to:

perform a bitwise AND operation of the bit filter score associated with the data quality rule and the corresponding bit validation score of the corresponding data record to generate an intermediate result; and determine whether the corresponding data record meets the data quality rule based on comparing the bit filter score associated with the data quality rule to the intermediate result.

12. The computing system of claim 7, wherein the one or more processors are further configured to:

select a second perspective from the plurality of perspectives, wherein the second perspective is associated with a second data quality rule;

perform a second one or more bitwise operations between a second bit filter score associated with the second data quality rule and the corresponding bit validation score for each of the plurality of data records to determine whether the plurality of data records meet the second data quality rule; and output, via the data quality interface layer to the one or more computing devices, an indication of whether the plurality of data records meet the second data quality rule.

13. A non-transitory computer-readable medium comprising instructions that, when executed, cause one or more processors of a computing system to:

determine, for each of a plurality of data records stored in a data storage system, a corresponding bit validation score, wherein the corresponding bit validation score for a corresponding data record encodes, as bits, a corresponding plurality of data validation answers for the corresponding data record, the corresponding plurality of data validation answers indicating whether the corresponding data record meets each of a plurality of data validation rules;

store, in the data storage system, an integer value of the corresponding bit validation score for each of the plurality of data records;

select a perspective from a plurality of perspectives, wherein each of the plurality of perspectives is associated with a corresponding one of one or more data quality rules;

perform one or more bitwise operations between a bit filter score associated with a data quality rule of the perspective and the corresponding bit validation score for each of the plurality of data records to determine whether the plurality of data records meet the data quality rule, wherein the bit filter score associated with the data quality rule is a bitstring that specifies one or more data validation answers out of the corresponding plurality of data validation answers for the corresponding data record that have to be true for the corresponding data record to meet the data quality rule; and output, via a data quality interface layer to one or more computing devices, an indication of whether the plurality of data records meet the data quality rule.

14. The non-transitory computer-readable medium of claim 13, wherein to determine, for each of the plurality of data records stored in the data storage system, the corresponding bit validation score, the instructions further cause the one or more processors to:

evaluate the corresponding data record against the plurality of data validation rules to determine the corresponding plurality of data validation answers for the corresponding data record, wherein the corresponding plurality of data validation answers for the corresponding data record indicate whether the corresponding data record meets each of the plurality of data validation rules;

encode each data validation answer of the corresponding plurality of data validation answers as a bit value that indicates whether the data validation answer evaluates to true or false to generate a plurality of bit values;

concatenate the plurality of bit values to generate the corresponding bit validation score for the data record; and generate an integer value of the corresponding bit validation score.

15. The non-transitory computer-readable medium of claim 14, wherein the instructions further cause the one or more processors to:

evaluate the corresponding data record against an additional one or more data validation rules to determine a corresponding one or more additional data validation answers for the corresponding data record;

encode each additional data validation answer of the corresponding one or more additional data validation answers as an additional bit value that indicates whether the data validation answer evaluates to true or false to generate one or more additional bit values;

concatenate the one or more additional bit values to the corresponding bit validation score for the corresponding data record to generate an updated corresponding bit validation score for the corresponding data record; and generate an integer value of the updated corresponding bit validation score.

16. The non-transitory computer-readable medium of claim 13, wherein the plurality of data records comprises a plurality of rows of one or more tables in the data storage system, and wherein to store the corresponding bit validation score for each of the plurality of data records as the integer value, the instructions further cause the one or more processors to:

store the corresponding bit validation score for each of the plurality of data records as the integer value in a column of the one or more tables.

17. The non-transitory computer-readable medium of claim 13, wherein to perform the one or more bitwise operations between the bit filter score associated with the data quality rule and the corresponding bit validation score for each of the plurality of data records to determine whether the plurality of data records meet the data quality rule, the instructions further cause the one or more processors to:

perform a bitwise AND operation of the bit filter score associated with the data quality rule and the corresponding bit validation score of the corresponding data record to generate an intermediate result; and determine whether the corresponding data record meets the data quality rule based on comparing the bit filter score associated with the data quality rule to the intermediate result.

* * * * *